(12) United States Patent
Diefendorff

(10) Patent No.: US 7,533,220 B2
(45) Date of Patent: May 12, 2009

(54) MICROPROCESSOR WITH IMPROVED DATA STREAM PREFETCHING

(75) Inventor: Keith E. Diefendorff, Los Gatos, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 133 days.

(21) Appl. No.: 11/463,954

(22) Filed: Aug. 11, 2006

(65) Prior Publication Data

US 2007/0043909 A1     Feb. 22, 2007

Related U.S. Application Data

(62) Division of application No. 10/449,825, filed on May 30, 2003, now Pat. No. 7,177,985.

(51) Int. Cl.
*G06F 12/00* (2006.01)

(52) U.S. Cl. .................. 711/137; 711/202; 711/203; 711/204; 711/205; 711/206; 711/207; 712/207

(58) Field of Classification Search ............... 711/137, 711/202–207; 712/207, 239
See application file for complete search history.

(56) References Cited

U.S. PATENT DOCUMENTS

| | | | |
|---|---|---|---|
| 5,375,216 A | 12/1994 | Moyer et al. | |
| 5,732,242 A | 3/1998 | Mowry | |
| 5,835,967 A | 11/1998 | McMahan | |
| 5,948,095 A * | 9/1999 | Arora et al. | 712/200 |
| 6,119,222 A | 9/2000 | Shiell et al. | |
| 6,128,703 A | 10/2000 | Bourekas et al. | |
| 6,202,130 B1 | 3/2001 | Scales et al. | |
| 6,240,488 B1 | 5/2001 | Mowry | |
| 6,401,192 B1 | 6/2002 | Schroter et al. | |
| 6,434,649 B1 | 8/2002 | Baker et al. | |
| 6,490,658 B1 | 12/2002 | Ahmed et al. | |
| 6,578,130 B2 | 6/2003 | Barrick et al. | |
| 6,775,765 B1 | 8/2004 | Lee et al. | |
| 6,785,772 B2 | 8/2004 | Venkumahanti et al. | |
| 6,832,280 B2 | 12/2004 | Malik et al. | |
| 6,854,048 B1 | 2/2005 | Dice | |

(Continued)

OTHER PUBLICATIONS

Struik, Pieter, Pieter van der Wolf, and Andry D. Pimentel. *A Combined Hardware/Software Solution for Stream Prefetching in Multimedia Applications*. Philips Research Laboratories. University of Amersterdam, The Netherlands.

(Continued)

*Primary Examiner*—Jasmine Song
(74) *Attorney, Agent, or Firm*—Sterne, Kessler, Goldstein & Fox PLLC

(57) ABSTRACT

A microprocessor coupled to a system memory has a memory subsystem with a translation look-aside buffer (TLB) for storing TLB information. The microprocessor also includes an instruction decode unit that decodes an instruction that specifies a data stream in the system memory and an abnormal TLB access policy. The microprocessor also includes a stream prefetch unit that generates a prefetch request to the memory subsystem to prefetch a cache line of the data stream from the system memory into the memory subsystem. If a virtual page address of the prefetch request causes an abnormal TLB access, the memory subsystem selectively aborts the prefetch request based on the abnormal TLB access policy specified in the instruction.

18 Claims, 20 Drawing Sheets

TLB Miss Operation

U.S. PATENT DOCUMENTS

| | | | |
|---|---|---|---|
| 6,981,099 | B2 | 12/2005 | Paulraj et al. |
| 6,985,999 | B2 | 1/2006 | Henry et al. |
| 7,177,985 | B1 | 2/2007 | Diefendorff |
| 7,194,582 | B1 | 3/2007 | Diefendorff et al. |
| 2003/0018875 | A1 | 1/2003 | Henry et al. |
| 2004/0186960 | A1 | 9/2004 | Andrew |
| 2007/0043907 | A1 | 2/2007 | Diefendorff |
| 2007/0043908 | A1 | 2/2007 | Diefendorff |
| 2007/0055824 | A1 | 3/2007 | Diefendorff et al. |
| 2007/0101104 | A1 | 5/2007 | Diefendorff |
| 2007/0101105 | A1 | 5/2007 | Diefendorff |

OTHER PUBLICATIONS

VanderWiel, Steven, David J. Litja. *A Survey of Data Prefetching Techniques*. Technical Report No. HPPC-96-05. University of Minnesota.

McKee, Sally A. et al. "Smarter Memory: Improving Bandwidth For Streamed References." *Computer* IEEE 1998.

VanderWiel, Steven P., David J. Lilja. "When Caches Aren't Enough: Data Prefetching Techniques." *Computer* IEEE 1997.

"Instruction Set Reference." *IA-32 Intel Architecture Software Developer's Manual*. vol. 2. 2001. pp. 3-600 through 3-601.

Diefendorff, Keith, Michael Allen. "Organization of the Motorola 88110 Superscalar Risc Microprocessor." *IEEE Micro* 1992.

Diefendorff, Keith, Rich Oehler, Ron Hochsprung. "Evolution of the PowerPC Architecture." *IEEE Micro* 1994.

Ball, Stuart, Robert Probin. "An Overview of Altivec on the PowerPC." 1998 Lightsoft.

*Altivec Technology Programming Environments Manual*. Digital DNA from Motorola. Feb. 2002.

*Altivec.* "The Caches: Memory and Alignment." Jun. 3, 2003.

Diefendorff, Keith et al. "Altivec Extension to PowerPC Accelerates Media Processing." *IEEE Micro* 2000.

Ollmann, Ian. "Altivec (a.k.a. Velocity Engine)." Altivec Tutorial. 2001.

\* cited by examiner

Stream Prefetch Unit

FIG. 4
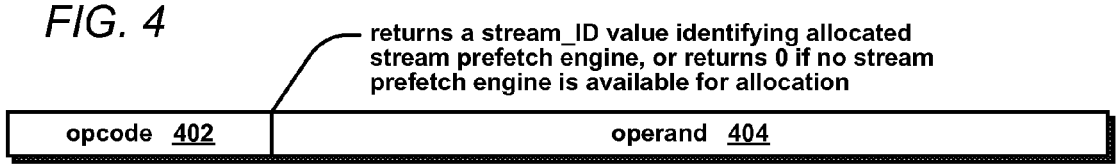
138 ➚   *Stream Prefetch Instruction*
FIG. 5
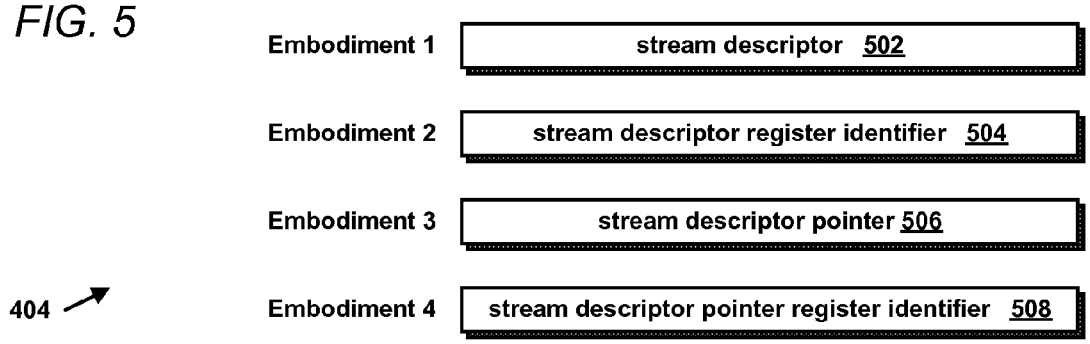
*Stream Prefetch Instruction Operand Embodiments*
FIG. 6
| stream_base 602 | stream_length 604 | stream_block_stride 606 | stream_block_size 608 | stream_fetch-ahead_distance 612 | stream_prefetch_priority_parameters 614 |
|---|---|---|---|---|---|
600 ➚   *Stream Descriptor*
FIG. 7
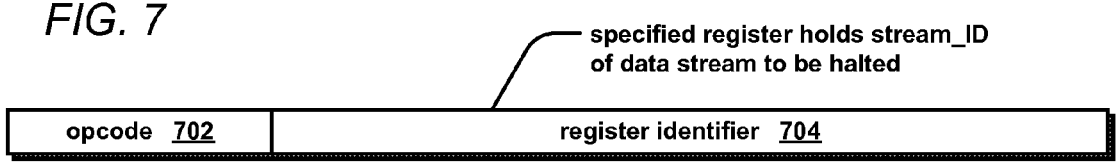
700 ➚   *Halt Stream Instruction*

Stream Prefetch Priority Parameters

Stream Template Example

FIG. 10
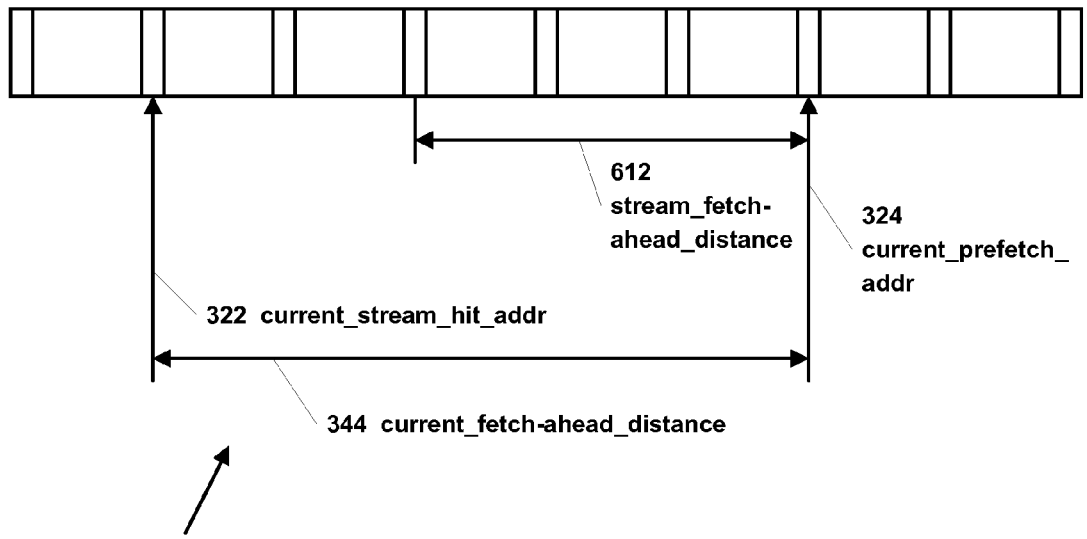
situation #1: stream prefetch engine stays suspended since current_fetch-ahead_distance is less than stream_fetch-ahead_distance
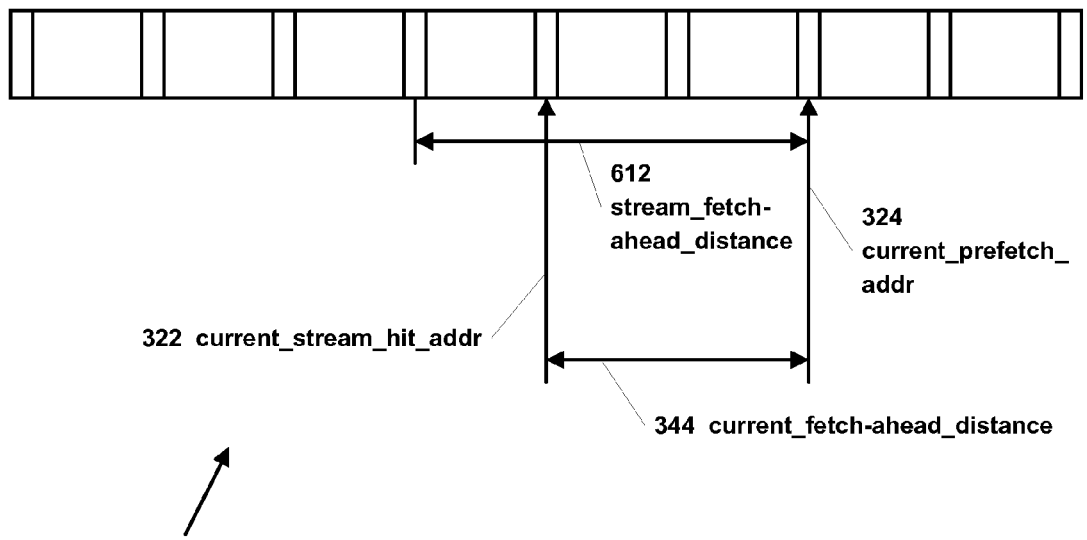
situation #2: stream prefetch engine resumes since current_fetch-ahead_distance is greater than stream_fetch-ahead_distance
*Stream Prefetch Trigger Condition Example*

Stream Prefetch Operation

1126 ↗  *Stream Prefetch Operation*

1126 ↗ *Stream Prefetch Operation with Hysteresis*

*TLB Miss Operation*

Page Fault Operation

Protection Fault Operation

Memory Subsystem with
Separate Stream Prefetch TLB

Memory Subsystem with Separate Stream Prefetch TLB (Alt. Emb.)

Memory Subsystem with
Separate Stream Prefetch TLBs (Alt. Emb.)

Stream Hit Detection

Stream Hit Detector

Stream Prefetch Operation

Stream Prefetch Operation

MICROPROCESSOR WITH IMPROVED DATA STREAM PREFETCHING

CROSS-REFERENCE TO RELATED APPLICATIONS

This application is a divisional of U.S. patent application Ser. No. 10/449,825 filed on May 30, 2003, U.S. Pat. No. 7,177,985.

This application is related to the following co-pending U.S. Non-Provisional Applications:

| Ser. No. U.S. Pat. No. | Filing Date (Issue Date) | Title |
| --- | --- | --- |
| 10/449,818 7,194,582 | May 30, 2003 (Mar. 20, 2007) | MICROPROCESSOR WITH IMPROVED DATA STREAM PREFETCHING |
| 11/463,957 | concurrently herewith | MICROPROCESSOR WITH IMPROVED DATA STREAM PREFETCHING |
| 11/463,939 | concurrently herewith | MICROPROCESSOR WITH IMPROVED DATA STREAM PREFETCHING |
| 11/549,413 | Oct. 13, 2006 | MICROPROCESSOR WITH IMPROVED DATA STREAM PREFETCHING |
| 11/549,418 | Oct. 13, 2006 | MICROPROCESSOR WITH IMPROVED DATA STREAM PREFETCHING |
| 11/463,950 | concurrently herewith | MICROPROCESSOR WITH IMPROVED DATA STREAM PREFETCHING |

FIELD OF THE INVENTION

This invention relates in general to the field of prefetching data into a microprocessor, and more specifically to efficient use of caches when prefetching data streams.

BACKGROUND OF THE INVENTION

A microprocessor is a digital device that executes instructions specified by a computer program. A typical computer system includes a microprocessor coupled to a system memory that stores program instructions and data to be processed by the program instructions. The performance of such a system is hindered by the fact that the time required to fetch data from the system memory into the microprocessor, referred to as memory fetch latency, is typically much larger than the time required for the microprocessor to execute the instructions that process the data. The time difference is often between one and two orders of magnitude. Thus, the microprocessor may be sitting idle with nothing to do while waiting for the needed data to be fetched from memory.

However, microprocessor designers recognized long ago that programs tend to access a relatively small proportion of the data a relatively large proportion of the time, such as frequently accessed program variables. Programs with this characteristic are said to display good temporal locality, and the propensity for this characteristic is referred to as the locality of reference principle. To take advantage of this principle, modern microprocessors typically include one or more cache memories. A cache memory, or cache, is a relatively small memory electrically close to the microprocessor core that temporarily stores a subset of data that normally resides in the larger, more distant memories of the computer system, such as the system memory. A cache memory may be internal or external, i.e., may be on the same semiconductor substrate as the microprocessor core or may be on a separate semiconductor substrate. When the microprocessor executes a memory access instruction, the microprocessor first checks to see if the data is present in the cache. If not, the microprocessor fetches the data into the cache in addition to loading it into the specified register of the microprocessor. Now since the data is in the cache, the next time an instruction is encountered that accesses the data, the data can be fetched from the cache into the register, rather than from system memory, and the instruction can be executed essentially immediately since the data is already present in the cache, thereby avoiding the memory fetch latency.

However, some software programs executing on a microprocessor manipulate large chunks of data in a relatively regular and linear fashion, which may be referred to as processing of data streams. Examples of such programs are multimedia-related audio or video programs that process a data stream, such as audio or video data. Typically, the data stream is present in an external memory, such as in system memory or a video frame buffer. Generally speaking, these programs do not demonstrate good temporal locality, since the data streams tend to be large, and the individual data elements in the stream are accessed very few times. For example, some programs read in the data stream only once, manipulate it, and write the results back out to another location, without ever referencing the original data stream again. Consequently, the benefits of the cache are lost, since the memory fetch latency must still be incurred on the first read of the data stream.

To address this problem, several modern microprocessors exploit the fact that that many times the programmer knows he will need the data well before execution of the instructions that actually process the data, such as arithmetic instructions. Consequently, modern microprocessors have added to or included in their instruction sets prefetch instructions to prefetch data into a cache of the processor before the data is needed. Some processors have even included prefetch instructions that enable the programmer to define a data stream to be prefetched. Other microprocessors have added hardware to detect a pattern of a data stream being accessed and begin prefetching into the data cache automatically. Prefetching enables the microprocessor to perform other useful work while the data is being prefetched from external memory in hopes that the data will be in the cache by the time the instruction that needs the data is executed.

However, current prefetching techniques still suffer drawbacks, and the need for improved prefetching performance is constantly increasing due to the proliferation of multimedia data streams and because memory latency is becoming longer relative to microprocessor execution speed.

SUMMARY

The present invention provides a microprocessor and method for improving data stream prefetching through a hybrid hardware/software approach.

In one aspect, the present invention provides a microprocessor coupled to a system memory. The microprocessor includes a memory subsystem, having a translation lookaside buffer (TLB) for storing TLB information. The microprocessor also includes an instruction decode unit, coupled to the memory subsystem, for decoding an instruction. The instruction specifies a data stream in the system memory and an abnormal TLB access policy. The microprocessor also includes a stream prefetch unit, coupled to the memory subsystem, for generating a prefetch request to the memory subsystem to prefetch a cache line of the data stream from the system memory into the memory subsystem. If a virtual page address of the prefetch request causes an abnormal TLB access, the memory subsystem selectively aborts the prefetch request based on the abnormal TLB access policy specified in the instruction.

In another aspect, the present invention provides a method for prefetching a data stream into a microprocessor from a system memory coupled to the microprocessor, the microprocessor having a translation look-aside buffer (TLB). The method includes decoding an instruction, specifies the data stream, a fetch-ahead distance, and a parameter specifies an abnormal TLB access policy. The method also includes monitoring load requests generated by the microprocessor to see if one of the load requests hits in the data stream within the fetch-ahead distance of a last prefetch from the data stream. The method also includes generating a prefetch request to prefetch a cache line of the data stream from the system memory into the microprocessor in response to the monitoring, the new request including a virtual page address of the cache line. The method also includes selectively aborting the prefetch request if the virtual page address causes an abnormal access of the TLB, based on the abnormal TLB access policy specified in the parameter.

In another aspect, the present invention provides a computer program product for use with a computing device, the computer program product including a computer usable storage medium, having computer readable program code embodied in the medium, for causing a microprocessor coupled to a system memory. The computer readable program code includes first program code for providing a memory subsystem, having a translation look-aside buffer (TLB) for storing TLB information. The computer readable program code also includes second program code for providing an instruction decode unit, coupled to the memory subsystem, for decoding an instruction. The instruction specifies a data stream in the system memory and an abnormal TLB access policy. The computer readable program code also includes third program code for providing a stream prefetch unit, coupled to the memory subsystem, for generating a prefetch request to the memory subsystem to prefetch a cache line of the data stream from the system memory into the memory subsystem. If a virtual page address of the prefetch request causes an abnormal TLB access, the memory subsystem selectively aborts the prefetch request based on the abnormal TLB access policy specified in the instruction.

Other features and advantages of the present invention will become apparent upon study of the remaining portions of the specification and drawings.

BRIEF DESCRIPTION OF THE DRAWINGS

FIG. 4 is a block diagram illustrating a stream prefetch instruction of FIG. 1 according to the present invention.

FIG. 5 is a block diagram illustrating four embodiments of the operand field of the stream prefetch instruction of FIG. 4 according to the present invention.

FIG. 6 is a block diagram illustrating the format of a stream descriptor according to one embodiment of the present invention.

FIG. 7 is a block diagram illustrating the format of a halt stream instruction according to the present invention.

FIG. 10 is a block diagram illustrating conditions which selectively trigger prefetching of a data stream with the stream template example of FIG. 9 according to the present invention.

DETAILED DESCRIPTION

Figure 1:
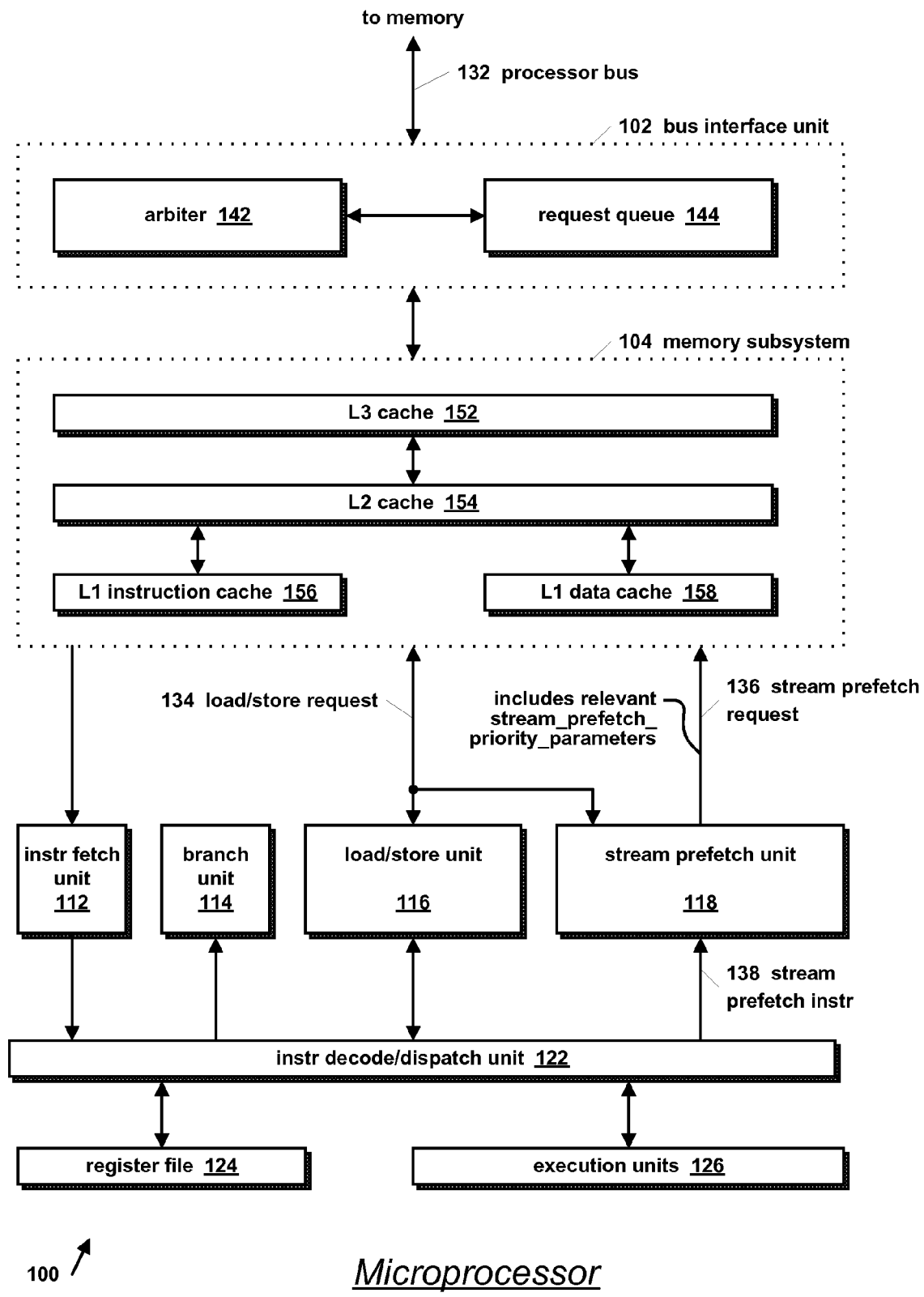
FIG. 1 is a block diagram of a microprocessor according to the present invention.

Referring now to FIG. 1, a block diagram of a microprocessor 100 according to the present invention is shown.

Microprocessor 100 includes a processor bus 132. Processor bus 132 couples microprocessor 100 to other devices in a computer system, including a system memory, such as dynamic random access memory (DRAM). In particular, the system memory stores data streams, which microprocessor 100 prefetches according to the present invention. Typically, the system memory stores program instructions and data executed by microprocessor 100. However, the system memory should be understood as encompassing any memory that stores a data stream that can be prefetched by microprocessor 100. A data stream is a set of bytes defined by a base memory address and an end memory address. The end memory address may be defined by a length added to the base address. The data stream may or may not include all the data bytes between the base and end addresses. Rather, the data stream may comprise a subset of the bytes between the base and end addresses. The base address may be a physical address or a virtual address. In an alternate embodiment, a data stream is a set of stream blocks defined by one or more stream block sizes, and one or more stream block stride distances between the stream blocks, and a base memory address specifying the first stream block. The individual data structure elements of a data stream that are processed may comprise various word sizes, including a single byte, a two-byte word, four-byte word, or any other number of bytes. Processor bus 132 comprises a medium for transmitting addresses, data, and control information between microprocessor 100 and the system memory. In one embodiment, processor bus 132 comprises a bus conforming substantially to the MIPS R10000 microprocessor bus. In one embodiment, processor bus 132 comprises a bus conforming substantially to the HyperTransport™ I/O Link Specification Revision 1.05.

Microprocessor 100 also includes a bus interface unit 102 coupled to processor bus 132. Bus interface unit 102 performs bus transactions on processor bus 132 to transfer data between microprocessor 100 and other system devices, such as the system memory. In particular, bus interface unit 102 performs bus transactions on processor bus 132 to prefetch portions of a data stream from the system memory into microprocessor 100 in response to a stream prefetch instruction specifying the data stream according to the present invention. In one embodiment, bus interface unit 102 is configured to combine multiple requests to perform transactions on processor bus 132 into one or more larger bus transaction requests on processor bus 132.

Microprocessor 100 also includes a memory subsystem 104 coupled to bus interface unit 102. Memory subsystem 104 comprises one or more cache memories and associated control logic for caching instructions and data from the system memory. In the embodiment shown in FIG. 1, memory subsystem 104 comprises a level-1 (L1) instruction cache 156, an L1 data cache 158, a unified level-2 (L2) cache 154 backing up the two L1 caches 156 and 158, and a level-3 cache 152, backing up L2 cache 154. In another embodiment, memory subsystem 104 also includes a dedicated prefetch buffer, for buffering prefetched cache lines from the system memory. A cache line is the smallest unit of data that can be transferred between the system memory and a cache of memory subsystem 104. In one embodiment, a cache line comprises 32 bytes. In one embodiment, L1 instruction cache 156 and L1 data cache 158 each comprise an 8 KB cache, L2 cache 154 comprises a 64 KB cache, and L3 cache 152 comprises a 512 KB cache. In one embodiment, L3 cache 152 comprises the highest level and L1 data cache 158 comprises the lowest level of the cache hierarchy of memory subsystem 104.

In the embodiment of FIG. 1, bus interface unit 102 includes a request queue 144, or request buffer 144, for storing requests made by memory subsystem 104 to perform a transaction on processor bus 132. Each request in request queue 144 includes information specifying the characteristics of the request. Bus interface unit 102 also includes an arbiter 142, coupled to request queue 144, which prioritizes the requests based on the request characteristics and issues transactions on processor bus 132 based on the prioritization. In one embodiment, translation look-aside buffers (TLBs) in memory subsystem 104, such as TLBs 1702, 1704, 1802, and 1902A-D of FIGS. 17 through 19, hold attribute bits associated with each memory page in the address space of microprocessor 100. In one embodiment, the attribute bits specify the bus transaction priority for loads, stores, and stream prefetches from the memory page. In one embodiment, the stream prefetch priority attributes held in the TLBs are populated based in part on a stream_prefetch_priority indicator 814, described below with respect to FIG. 8. In one embodiment, when memory subsystem 104 makes a request to bus interface unit 102, memory subsystem 104 provides the TLB attribute bits to bus interface unit 102. In one embodiment, when memory subsystem 104 makes a request to bus interface unit 102, memory subsystem 104 uses the TLB attribute bits to generate the priority of the request to bus interface unit 102. In one embodiment, when memory subsystem 104 makes a request to bus interface unit 102, memory subsystem 104 generates the priority of the request to bus interface unit 102 based on a task priority, described below with respect to FIG. 8.

Microprocessor 100 also includes an instruction fetch unit 112 coupled to memory subsystem 104. Instruction fetch unit 112 fetches program instructions from L1 instruction cache 156. If the requested instruction is missing in L1 instruction cache 156, L2 cache 154, and L3 cache 152, then memory subsystem 104 requests bus interface unit 102 to fetch a cache line including the missing instruction from the system memory. In particular, instruction fetch unit 112 fetches load instructions, store instructions, stream prefetch instructions, and stream halt instructions according to the present invention.

Microprocessor 100 also includes an instruction decode/dispatch unit 122 coupled to instruction fetch unit 112. Instruction decode/dispatch unit 122 decodes program instructions provided by instruction fetch unit 112 and dispatches the decoded instructions to the appropriate functional units of microprocessor 100 for execution. In particular, instruction decode/dispatch unit 122 decodes and dispatches load instructions, store instructions, stream prefetch instructions, and halt stream instructions, according to the present invention.

Microprocessor 100 also includes a branch unit 114. Branch unit 114 receives branch instructions from instruction decode/dispatch unit 122 and communicates with instruction fetch unit 112 to control program flow by altering the address at which instruction fetch unit 112 fetches instructions. In one embodiment, branch unit 114 includes branch prediction logic for predicting the outcome and target address of a branch instruction.

Microprocessor 100 also includes a register file 124 coupled to instruction decode/dispatch unit 122. Register file 124 includes a plurality of general purpose registers for use by programs executing on microprocessor 100. Register file 124 also includes special purpose registers for controlling the state of microprocessor 100. In particular, register file 124 holds instruction operands and results of stream prefetch instructions according to the present invention.

Microprocessor 100 also includes a plurality of execution units 126 coupled to instruction decode/dispatch unit 122. In one embodiment, execution units 126 include an integer unit and a floating point unit, for performing integer and floating point arithmetic or logical operations, respectively. In particular, execution units 126 perform arithmetic and logical operations on data elements in data streams prefetched according to the present invention.

Microprocessor 100 also includes a load/store unit 116 coupled to instruction decode/dispatch unit 122 and memory subsystem 104. A load instruction loads data specified by a memory address into a register of register file 124. A store instruction stores data from a register of register file 124 to a specified memory address. Load/store unit 116 receives load and store instructions from instruction decode/dispatch unit 122 and issues one or more load/store requests 134 to memory subsystem 104 to load data from memory subsystem 104 (or from the system memory if the specified data is not present in memory subsystem 104) into register file 124 or to store data from register file 124 to memory subsystem 104 (or the system memory). In particular, a load instruction may be executed to transfer a portion of a data stream from the system memory into register file 124 for processing by execution units 126. Advantageously, the cache line of the data stream specified by the load instruction may be present in memory subsystem 104 when the load instruction executes due to execution of a stream prefetch instruction according to the present invention as described below, thereby obviating the need to fetch the data from the system memory and avoiding its accompanying latency, as would be required if the data were missing in memory subsystem 104. Similarly, a store instruction may be executed to transfer data processed by execution units 126 from register file 124 to a portion of a data stream in the system memory. Advantageously, the cache line of the data stream specified by the store instruction may be present in memory subsystem 104 when the store instruction executes due to execution of a stream prefetch instruction according to the present invention as described below, thereby obviating, in a write-back cache configuration, the need to immediately write the data to the system memory and avoiding its accompanying latency, as would be required if the data were missing in memory subsystem 104. Load/store request 134 includes an indication of whether the request 134 is a load or store, a memory address of the specified data, and the amount of data to be loaded into or stored from microprocessor 100. In one embodiment, load/store request 134 also includes a priority value for use in prioritizing the load/store request 134 relative to stream prefetch requests 136 and to other load/store requests 134.

Microprocessor 100 also includes a stream prefetch unit 118 coupled to instruction decode/dispatch unit 122 and memory subsystem 104. Stream prefetch unit 118 receives a stream prefetch instruction 138 according to the present invention from instruction decode/dispatch unit 122 and issues a stream prefetch request 136 to memory subsystem 104 in response thereto. Stream prefetch instruction 138 includes a stream prefetch instruction opcode 402 and a stream descriptor 600, as described in detail with respect to FIGS. 4, 6, and 8 below. As described below with respect to FIG. 2, stream prefetch request signal 136 comprises a plurality of stream prefetch request 136 signals from a corresponding plurality of stream prefetch engines 202 of stream prefetch unit 118. Stream prefetch request 136 includes a memory address, namely current_prefetch_addr 324 described below with respect to FIG. 3, for specifying a location in the system memory from which to prefetch a portion of a data stream specified by stream prefetch instruction 138. In one embodiment, stream prefetch request 136 prefetches one or more cache lines containing the specified memory address. Stream prefetch request 136 also includes values of various portions of stream prefetch instruction 138, such as stream_priority_parameters 614 described below with respect to FIG. 6. Stream prefetch unit 118 also receives load/store request 134 from load/store unit 116 in order to monitor load and store requests to determine whether a load/store request 134 hits within a data stream specified by stream prefetch instruction 138, thereby advantageously enabling stream prefetch unit 118 to prefetch the data stream in a manner synchronized with program execution of loads (or stores, or both) accessing the data stream, as described below. In one embodiment, stream prefetch unit 118 also receives a halt stream instruction 700, as described below with respect to FIG. 7, from instruction decode/dispatch unit 122 for halt-ing stream prefetch unit 118 from prefetching a data stream specified by a previously executed stream prefetch instruction 138. Stream prefetch unit 118 and stream prefetch instruction 138 are described in detail below with respect to the remaining Figures.

Figure 2:
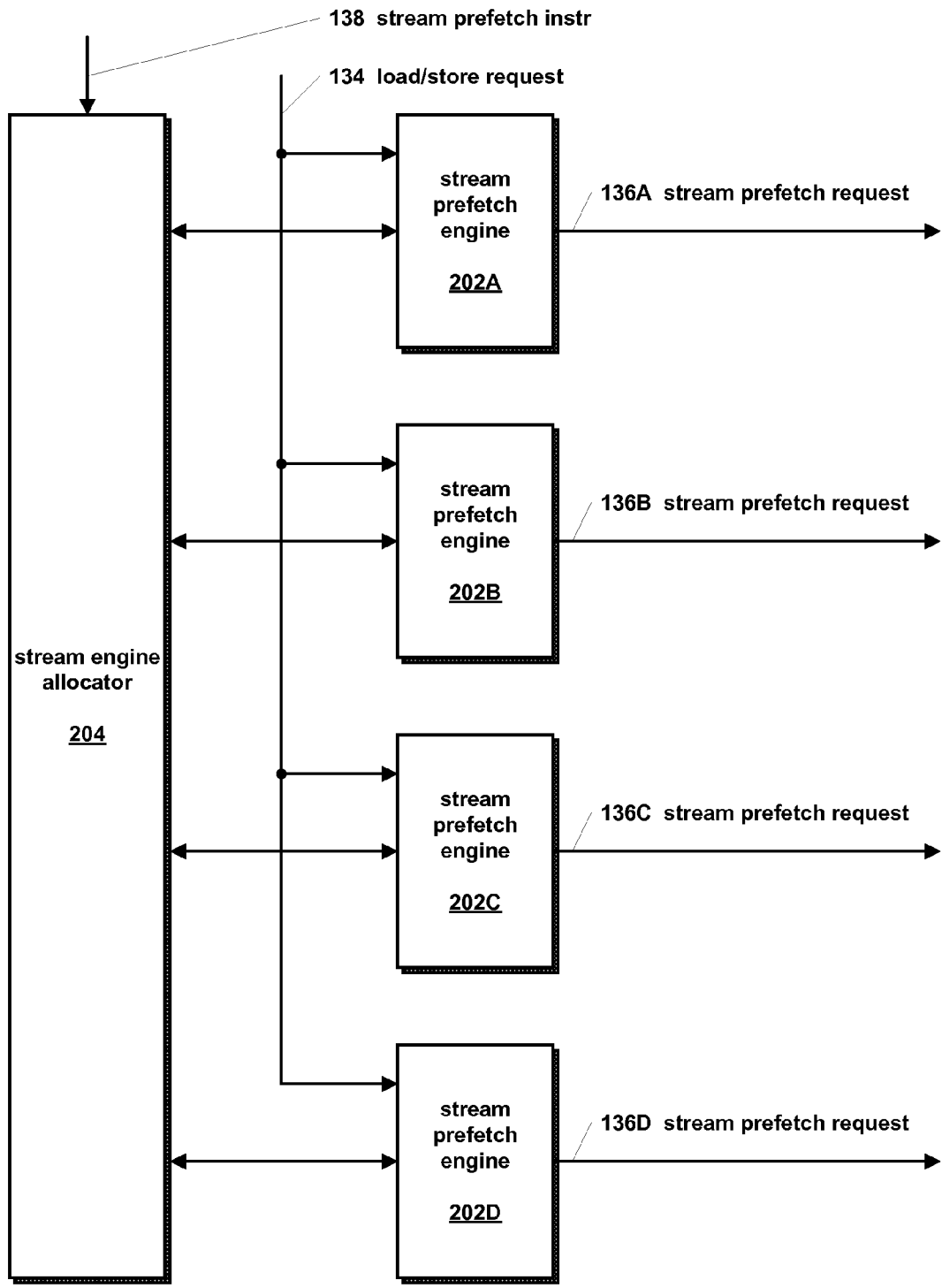
FIG. 2 is a block diagram of the stream prefetch unit of FIG. 1 according to the present invention.

Referring now to FIG. 2, a block diagram of stream prefetch unit 118 of FIG. 1 according to the present invention is shown.

Stream prefetch unit 118 includes a stream engine allocator 204 and a plurality of stream prefetch engines 202 coupled to stream engine allocator 204. The embodiment of FIG. 2 shows four stream prefetch engines 202, denoted 202A, 202B, 202C, and 202D, which generate stream prefetch requests 136A, 136B, 136C, and 136D, respectively, referred to as stream prefetch request 136 in FIG. 1. Stream engine allocator 204 maintains a status of each stream prefetch engine 202 regarding whether the stream prefetch engine 202 is currently in use, i.e., whether the stream prefetch engine 202 has been allocated by a currently executing stream prefetch instruction 138, or whether the stream prefetch engine 202 is free for allocation. Stream engine allocator 204 receives stream prefetch instruction 138 of FIG. 1. In response, stream engine allocator 204 determines whether a stream prefetch engine 202 is free, and if so, allocates a free stream prefetch engine 202 for the stream prefetch instruction 138 and returns an identifier to a stream prefetch engine 202A, 202B, 202C, or 202D in a predetermined register of register file 124 of FIG. 1 as the result of the stream prefetch instruction 138. That is, stream engine allocator 204 updates the status of the allocated stream prefetch engine 202 to indicate that the allocated stream prefetch engine 202 is now in use. Stream engine allocator 204 subsequently forwards the stream prefetch instruction 138 to the allocated stream prefetch engine 202. Hence, in the embodiment of FIG. 2, microprocessor 100 can simultaneously execute up to four distinct stream prefetch instructions 138.

Each stream prefetch engine 202 receives load/store request 134 of FIG. 1 for monitoring whether a load/store request 134 hits in the data stream specified by the stream prefetch instruction 138 to which the stream prefetch engine 202 is allocated. In response to the stream prefetch instruction 138 forwarded from stream engine allocator 204 and in response to load/store request 134 hitting in the data stream specified by the stream prefetch instruction 138, a stream prefetch engine 202 generates a stream prefetch request 136 to memory subsystem 104 of FIG. 1 to prefetch portions of the specified data stream as described below. The stream prefetch engines 202 are described in detail below with respect to the remaining Figures.

Figure 3:
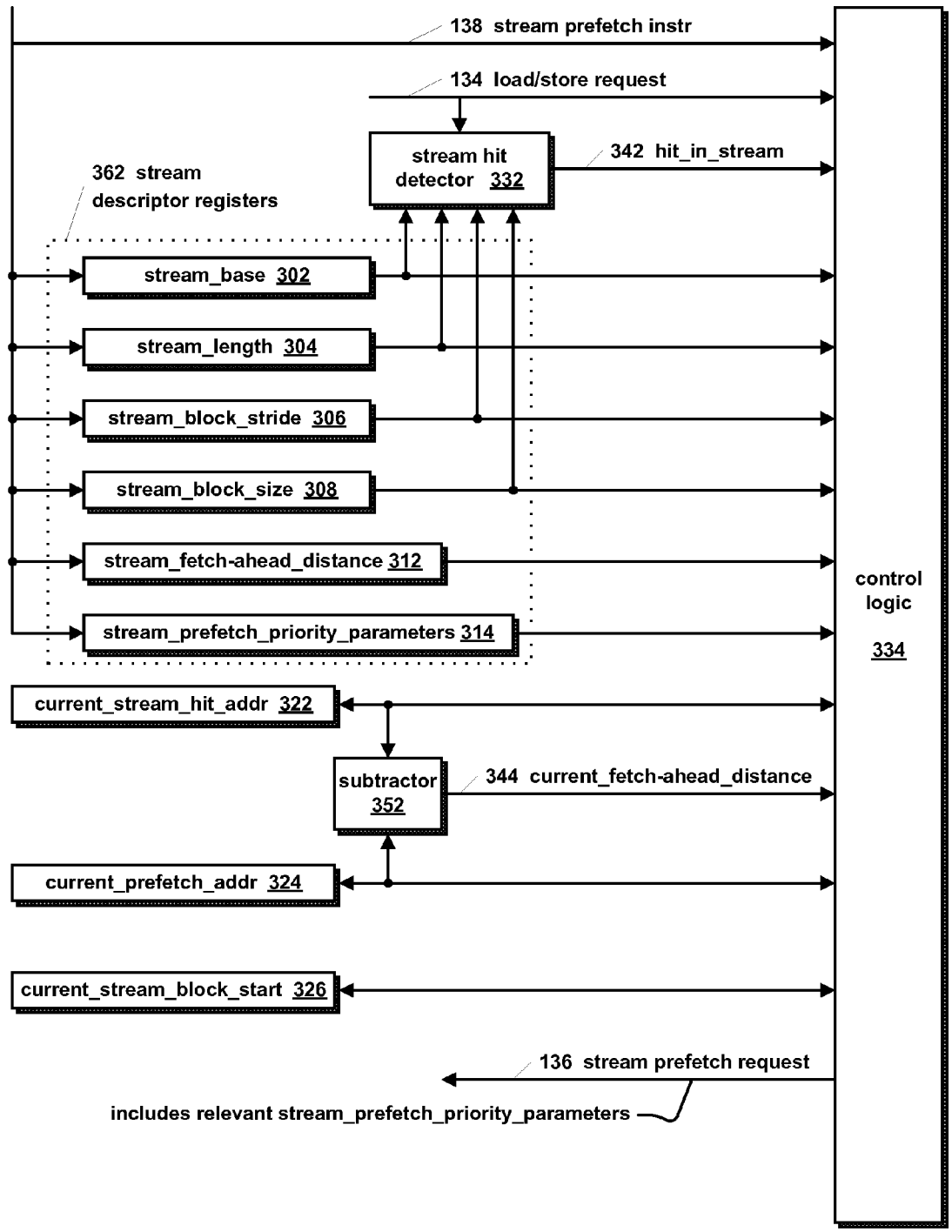
FIG. 3 is a block diagram of a stream prefetch engine of FIG. 2 according to the present invention.

Referring now to FIG. 3, a block diagram of a stream prefetch engine 202 of FIG. 2 according to the present invention is shown.

Stream prefetch engine 202 includes control logic 334 that receives stream prefetch instruction 138 and load/store request 134 of FIG. 1. Control logic 334 comprises combinatorial and sequential logic that generates stream prefetch requests 136 of FIG. 1 in response to stream prefetch instruction 138, load/store requests 134, and other inputs described below.

Stream prefetch engine 202 also includes six registers, 302, 304, 306, 308, 312, and 314, referred to collectively as stream descriptor registers 362, for storing six corresponding fields 602, 604, 606, 608, 612, and 614, respectively, of a stream descriptor 600, which is described below with respect to FIG. 6, specified by stream prefetch instruction 138. Each of the stream descriptor registers 362 provides its contents to control logic 334. The remainder of FIG. 3 will be described after a description of FIG. 6.

Referring now to FIG. 6, a block diagram illustrating the format of a stream descriptor 600 according to one embodiment of the present invention is shown.

Stream descriptor 600 includes a stream_base field 602 that specifies the base memory address, i.e., the starting address, of the data stream. In one embodiment, the stream_base 602 is a virtual address. In one embodiment, the stream_base 602 is a physical address.

Stream descriptor 600 also includes a stream_length field 604 that specifies the difference between the end address of the stream, i.e., the memory address of the last byte of the data stream, and the stream_base 602. That is, the stream_length 604 specifies the number of bytes in memory between the first byte of the data stream and the last byte of the data stream. However, the stream_length 604 does not necessarily equal the number of bytes in the data stream, since a data stream may be specified as a subset of the bytes between the stream_base 602 and the stream end address. In one embodiment, if the programmer specifies a stream_length 604 value of 0, then the data stream is unbounded, and the stream prefetch engine 202 synchronously prefetches the data stream, by monitoring loads and stores as described herein, until halted by execution of a halt stream instruction, described below with respect to FIG. 7.

Stream descriptor 600 also includes a stream_block_size field 608 that specifies the size of a stream block. In one embodiment, the stream_block_size field 608 specifies the number of bytes included in a stream block. A stream block comprises a contiguous set of bytes within the data stream. If a load/store request 134 specifies a location within a stream block of a data stream specified by stream descriptor 600, then the load/store request 134 hits in the data stream.

Figure 9:
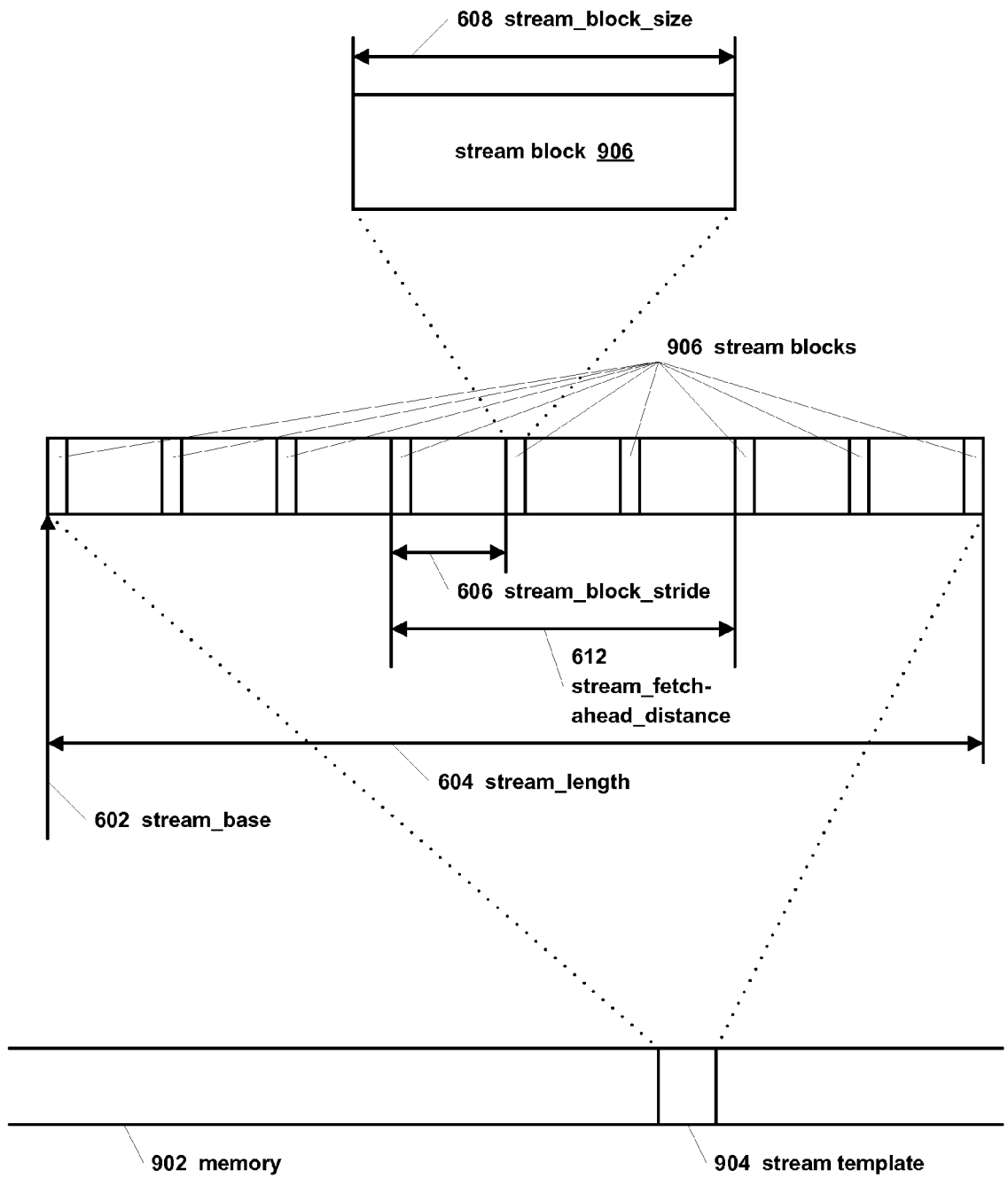
FIG. 9 is a block diagram illustrating an example data stream template specified by a stream descriptor of FIG. 6 according to the present invention.

Stream descriptor 600 also includes a stream_block_stride field 606 that specifies the periodic distance between stream blocks. That is, the stream_block_stride 606 specifies the number of bytes between the first byte of a stream block and the first byte of the next adjacent stream block. Thus, stream descriptor 600 advantageously enables the programmer to specify a data stream which is a sparse subset of, or a discontiguous template on, a contiguous set of bytes in memory. FIG. 9 illustrates an example data stream template specified by stream descriptor 600.

Stream descriptor 600 also includes a stream_fetch-ahead_distance 612. The stream prefetch engines 202 monitor load/store requests 134 that hit in their respective data streams and attempt to stay at least the number of bytes specified by the stream_fetch-ahead_distance 612 ahead of the current_stream_hit_addr 322 of FIG. 3, as described below with respect to FIGS. 10 through 13, thereby synchronizing prefetching of the data stream with program execution. That is, stream prefetch engine 202 suspends data stream prefetching when the current_stream_hit_addr 322 is at least the stream_fetch-ahead_distance 612 behind the current_prefetch_addr 324, and resumes data stream prefetching when the current_stream_hit_addr 322 is less than the stream_fetch-ahead_distance 612 behind the current_prefetch_addr 324, as described below.

Stream descriptor 600 also includes a stream_prefetch_priority_parameters field 614. The stream_prefetch_priority_parameters field 614 specifies a plurality of parameters used by microprocessor 100 to prioritize use of memory subsystem 104 and data stream prefetch requests relative to other memory accesses within microprocessor 100. The stream_prefetch_priority_parameters 614 are described in detail below with respect to FIG. 8.

Referring again to FIG. 3, stream prefetch engine 202 also includes a stream hit detector 332 coupled to control logic 334. Stream hit detector 332 receives the contents of stream_base register 302, stream_length register 304, stream_block_stride register 306, and stream_block_size register 308. Stream hit detector 332 also receives load/store request 134. In response to its inputs, stream hit detector 332 generates a hit_in_stream signal 342, which is provided to control logic 334. Stream hit detector 332 generates a true value on hit_in_stream signal 342 if the address of a load/store request 134 hits in the data stream specified by stream prefetch instruction 138 in stream descriptor 600, as discussed below. That is, stream hit detector 332 generates a true value on hit_in_stream signal 342 if the address of a load/store request 134 specifies the address of a byte in system memory included in the data stream specified by stream prefetch instruction 138 stream descriptor 600. Otherwise, stream hit detector 332 generates a false value on hit_in_stream signal 342. The operation of stream hit detector 332 is described below with respect to FIG. 20. One embodiment of stream hit detector 332 is described below with respect to FIG. 21.

Stream prefetch engine 202 also includes a current_stream_hit_addr register 322, coupled to control logic 334, which holds the address of the most recent load/store request 134 that hit in the data stream specified by the stream prefetch instruction 138.

Stream prefetch engine 202 also includes a current_prefetch_addr register 324, coupled to control logic 334, which holds the address of the next element of the data stream to be prefetched, i.e., the cache line implicated by the address will be prefetched into memory subsystem 104.

Stream prefetch engine 202 also includes a current_stream_block_start register 326, coupled to control logic 334, which holds the starting address of the stream block currently being prefetched, i.e., that encompasses current_prefetch_addr 324. The size of a stream block is defined by stream_block_size 608 of FIG. 6 held in stream_block_size register 308.

Stream prefetch engine 202 also includes a subtractor 352 coupled to current_stream_hit_addr register 322 and current_prefetch_addr register 324. Subtractor 352 subtracts current_stream_hit_addr 322 from current_prefetch_addr 324 to generate a current_fetch-ahead_distance 344, which is provided to control logic 334.

Referring now to FIG. 4, a block diagram illustrating stream prefetch instruction 138 of FIG. 1 according to the present invention is shown.

In the embodiment shown in FIG. 4, stream prefetch instruction 138 includes an opcode field 402 and an operand field 404. Opcode 402 includes a predetermined value within the opcode space of microprocessor 100 which instruction decode/dispatch unit 122 of FIG. 1 decodes as a stream prefetch instruction. In one embodiment, a first predetermined value of opcode 402 specifies a stream prefetch instruction in anticipation of loads from the data stream, and a second predetermined value of opcode 402 specifies a stream prefetch instruction in anticipation of stores to the data stream. If a stream prefetch for load instruction is specified in opcode 402, the cache lines prefetched into memory subsystem 104 are initialized with a cache coherency state of shared. If a stream prefetch for store instruction is specified in opcode 402, the cache lines prefetched from the data stream are brought into the specified cache of the memory subsystem 104 with a cache coherency state of exclusive-unmodified. Advantageously, the stream prefetch for store instruction avoids the latency associated with a transaction on processor bus 132 of FIG. 1 to transition the implicated cache line from shared to exclusive state when a subsequent store operation modifies a previously prefetched cache line of the data stream.

Stream prefetch instruction 138 also includes an operand field 404 following opcode field 402. The operand field 404 is used to specify the stream descriptor 600 of FIG. 6. The operand field 404 specifies the stream descriptor 600 according to one of the four embodiments shown in FIG. 5. In embodiment 1 of FIG. 5, the operand field 404 holds the stream descriptor itself, denoted 502, as immediate data. In embodiment 2 of FIG. 5, a load instruction executed before the stream prefetch instruction 138 loads the stream descriptor into a general purpose register of register file 124 of FIG. 1, and the operand field 404 holds a register identifier, denoted 504, that identifies the register holding the stream descriptor. In embodiment 3 of FIG. 5, the stream descriptor is stored in system memory by the program prior to execution of the stream prefetch instruction 138, and the operand field 404 holds a pointer or address, denoted 506, to the stream descriptor in the system memory. In embodiment 4 of FIG. 5, the stream descriptor is stored in system memory by the program prior to execution of the stream prefetch instruction 138, a load instruction executed before the stream prefetch instruction loads the system memory address of the stream descriptor into a general purpose register of register file 124, and the operand field 404 holds a register identifier, denoted 506, that identifies the register holding the stream descriptor address. In one embodiment, a different predetermined opcode 402 value exists within the instruction set opcode space for differentiating between the different embodiments for specifying the stream descriptor of FIG. 5.

The stream prefetch instruction 138 returns a stream_ID value that specifies which of the plurality of stream prefetch engines 202 was allocated to the stream prefetch instruction 138. If no stream prefetch engine 202 is free, then a predetermined value is returned by the stream prefetch instruction 138. In one embodiment, the predetermined value is 0, and values 1 through N are returned to specify one of the N stream prefetch engines 202 allocated by the stream prefetch instruction 138. In one embodiment, the stream_ID is returned in a predetermined one of the general purpose registers of register file 124 of FIG. 1.

In one embodiment, stream engine allocator 204 also stores an identifier specifying the currently executing task that executed the stream prefetch instruction 138. The task identifier is used by stream engine allocator 204 and the operating system executing on microprocessor 100 to save and restore the state of the allocated stream prefetch engine 202 between task switches by the operating system.

In one embodiment, stream prefetch instruction 138 is a hint to microprocessor 100. That is, stream prefetch instruction 138 does not affect the architectural state of microprocessor 100. The correct functional operation of the program executing stream prefetch instruction 138 does not depend upon whether or not the data stream specified by stream prefetch instruction 138 has been successfully prefetched, although the performance of the program may be affected thereby. Consequently, microprocessor 100 performs stream prefetch instruction 138 on a best-effort basis. For example, in one embodiment, if bus interface unit 102 is busy servicing other program instructions, such as loads, stores, or instruction fetches, then stream prefetch requests 136 are delayed until bus interface unit 102 is no longer busy. Similarly, in one embodiment, loads, stores, and instruction fetches are given higher priority within memory subsystem 104 over stream prefetch instructions 138.

Referring now to FIG. 7, a block diagram illustrating the format of a halt stream instruction 700 according to the present invention is shown. The halt stream instruction 700 includes an opcode field 702 and a register identifier field 704. Opcode 702 includes a predetermined value within the opcode space of microprocessor 100 which instruction decode/dispatch unit 122 of FIG. 1 decodes as a halt stream instruction. The register identifier 704 specifies a register that is previously loaded with a stream_ID value that specifies which of the stream prefetch engines 202 of FIG. 2 is to be halted from prefetching its current data stream. The stream_ID returned by the stream prefetch instruction 138 is used to populate the register specified by the register identifier field 704 of the stream halt instruction. The halted stream prefetch engine 202 specified by the stream_ID in the register specified by the register identifier 704 is returned to the free pool of stream prefetch engines 202 for allocation by stream engine allocator 204 to a subsequent stream prefetch instruction.

Figure 8:
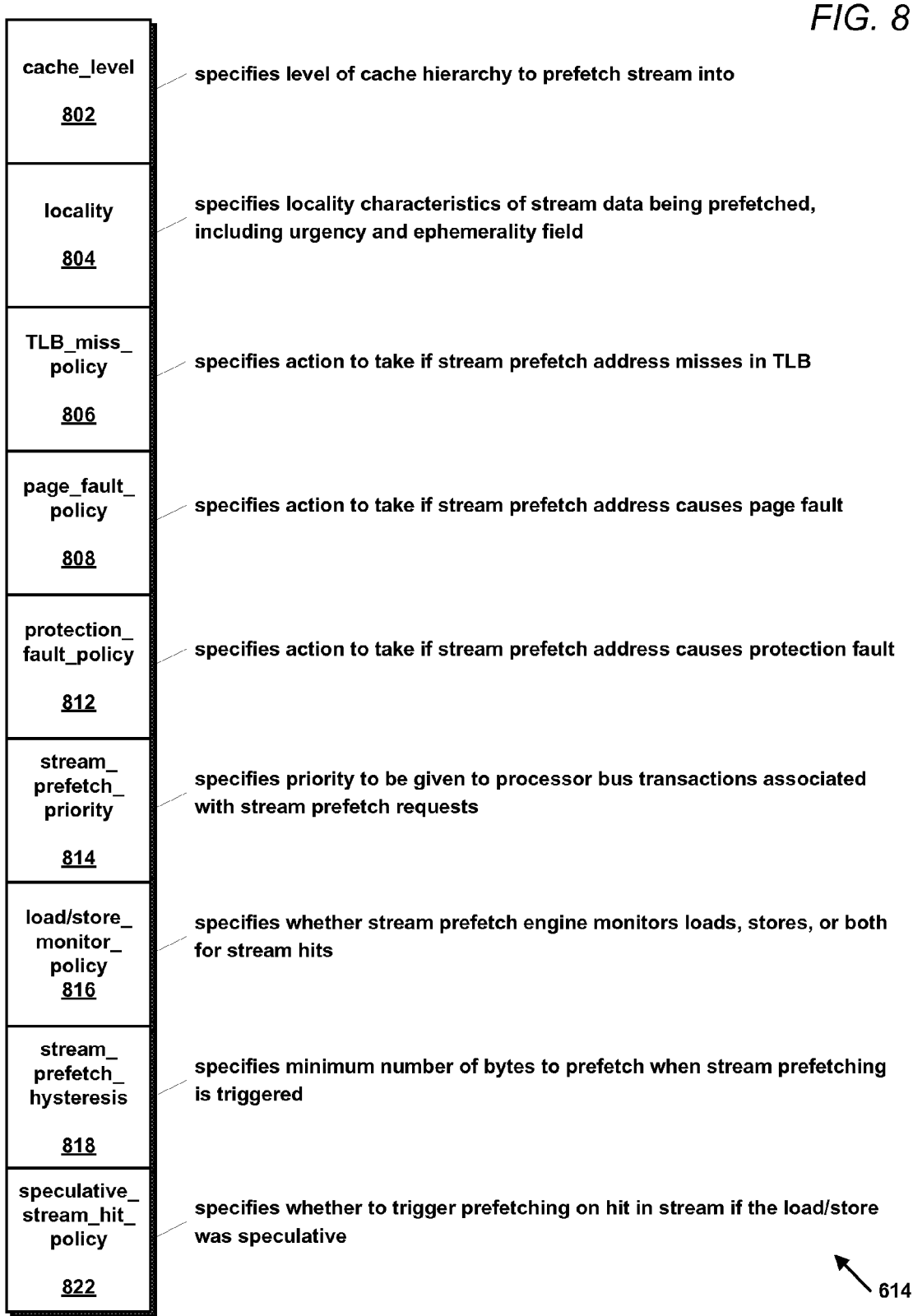
FIG. 8 is a block diagram illustrating the stream_prefetch_priority_parameters of FIG. 6 according to the present invention.

Referring now to FIG. 8, a block diagram illustrating stream_prefetch_priority_parameters 614 of FIG. 6 according to the present invention is shown.

Stream_prefetch_priority_parameters 614 include a cache_level indicator 802. Cache_level indicator 802 specifies which level of the cache hierarchy of memory subsystem 104 the cache lines of the prefetched data stream are to be brought into. In one embodiment, a value of 1 in cache_level indicator 802 specifies L1 data cache 158 of FIG. 1, a value of 2 in cache_level indicator 802 specifies L2 cache 154 of FIG. 1, a value of 3 in cache_level indicator 802 specifies L3 cache 152 of FIG. 1. In one embodiment, a value of 4 in cache_level indicator 802 specifies a prefetch buffer (not shown) in memory subsystem 104. In one embodiment, a value of 5 in cache_level indicator 802 specifies L1 instruction cache 156 of FIG. 1. In one embodiment, a value of 0 in cache_level indicator 802 specifies that no cache level is specified. Advantageously, cache_level indicator 802 enables the programmer to efficiently use the memory subsystem 104 based on the locality characteristics of the data stream. For example, if the data stream will be accessed many times within a section of the program, the programmer may wish to place the data stream into the L1 data cache 158, whereas if the data stream will only be accessed once or twice as the program passes through the data stream, the programmer may wish to place the data stream into the L2 cache 154 or L3 cache 152, in order to avoid replacing other more frequently used data in the L1 data cache 158. Advantageously, a programmer also, if he knows the configuration of the hierarchy of the cache memories in memory subsystem 104 and the size of each cache, can tailor the stream_fetch-ahead_distance 612 and cache_level indicator 802 to avoid wasting memory bandwidth and overrunning the specified cache, thereby avoiding needlessly evicting other useful data, including prefetched stream data.

The value of cache_level indicator 802 is forwarded to memory subsystem 104 in stream prefetch request 136. In one embodiment, if stream prefetch request 136 misses in the level of the memory subsystem 104 hierarchy specified by cache_level indicator 802 but hits in a different level of the memory subsystem 104 hierarchy, then memory subsystem 104 moves the data to the level specified by cache_level indicator 802. In one embodiment, if stream prefetch request 136 misses in the level of the memory subsystem 104 hierarchy specified by cache_level indicator 802 but hits in a different level of the memory subsystem 104 hierarchy, then memory subsystem 104 leaves the data in its current level. If stream prefetch request 136 misses in the memory subsystem 104 hierarchy altogether, then memory subsystem 104 generates a request to bus interface unit 102 to fetch the missing cache line.

Stream_prefetch_priority_parameters 614 also include a locality indicator 804. Locality indicator 804 is an alternative to the cache_level indicator 802 for specifying the locality characteristics of the data stream. The programmer places a value of 0 in the cache_level indicator 802 when using locality indicator 804 to specify data stream prefetch characteristics. Locality indicator 804 enables the programmer to abstractly provide his intention of how the data stream should be prefetched into the memory subsystem 104, but leaves the decision to the microprocessor 100 to map the intentions specified by the programmer to the particular cache hierarchy embodied in the microprocessor 100 executing the stream prefetch instruction 138. Locality indicator 804 alleviates the need for the programmer to understand the intricacies of the memory subsystem 104 for each version of microprocessor 100 and facilitates compatibility and improved performance across a wide range of versions of microprocessor 100. This is particularly advantageous because a programmer may write a program that will be executed on different versions of microprocessor 100 that have different memory subsystem 104 configurations, and further, the program may execute on version of microprocessor 100 yet to be produced. For example, one version of microprocessor 100 may have an L1 data cache 158, an L2 cache 154, and an L3 cache 152; whereas another version of microprocessor 100 may only have an L1 data cache 158, an L2 cache 154. Similarly, for example, the L1 data cache 158 of one version of microprocessor 100 may be 32 KB; whereas the L1 data cache 158 of another version of microprocessor 100 may be only 8 KB.

In one embodiment, locality indicator 804 includes an urgency field for specifying the urgency of the data stream. In one embodiment, an urgency field value of 0 indicates the data is urgent and should be brought into as low a level of the cache hierarchy as is reasonable; an urgency field value of 1 indicates the data is moderately urgent and should be brought into a middle level of the cache hierarchy if reasonable; and an urgency field value of 2 indicates the data is not urgent and should be brought into as high a level of the cache hierarchy as is reasonable.

In one embodiment, locality indicator 804 includes an ephemerality field for specifying the ephemerality of the data stream. In one embodiment, an ephemerality field value of 0 indicates the data is very ephemeral and should be brought into memory subsystem 104 and marked for early eviction. In one embodiment, bringing the prefetched cache line into the cache for early eviction comprises setting the prefetched cache line as the least-recently-used way in a set associative cache that employs a least-recently-used (LRU) replacement policy. An ephemerality field value of 1 indicates the data stream should be brought into memory subsystem 104 and treated normally by the cache replacement policy, whatever the replacement policy is. An ephemerality field value of 2 indicates the data stream is highly persistent, and memory subsystem 104 should be brought into memory subsystem 104 and marked for late eviction, i.e., memory subsystem 104 should attempt to evict other cache lines before evicting this cache line. In one embodiment, bringing the prefetched cache line into the cache for late eviction comprises setting the prefetched cache line as the most-recently-used way in a set associative cache that employs a least-recently-used (LRU) replacement policy.

In one embodiment, control logic 334 specifies a cache level and eviction policy in stream prefetch request 136 based on locality indicator 804 or cache_level 802, stream_fetch-ahead_distance 612, and the configuration of memory subsystem 104 to advantageously avoid memory fetch latency while keeping the memory subsystem 104 as clean as possible.

Stream_prefetch_priority_parameters 614 also include three fields for specifying a policy for responding to three distinct abnormal accesses to a TLB in memory subsystem 104 of FIG. 1. In a normal TLB access, the TLB is accessed with a virtual page address, and the TLB looks up the page address and finds the page address cached therein, i.e., the page address hits in the TLB. The first abnormal TLB access is a TLB miss, i.e., the virtual page address is not cached in the TLB. In a normal TLB access, the TLB provides cached TLB information associated with the memory page specified by the page address, including the translated physical page address of the virtual page address. The second abnormal TLB access is a page fault, wherein the TLB information indicates the memory page specified by the virtual page address is not present in the system memory. The third abnormal TLB access is a memory protection fault, wherein the TLB information indicates the access to the memory page specified by the virtual page address constitutes a memory protection violation.

Stream_prefetch_priority_parameters 614 also include a TLB_miss_policy field 806. TLB_miss_policy field 806 specifies the action memory subsystem 104 takes in the event current_prefetch_address 324 of stream prefetch request 136 misses in a TLB of memory subsystem 104, which is an abnormal TLB access. In one embodiment, the value of TLB_miss_policy field 806 is forwarded to the memory subsystem 104 in stream prefetch request 136. In one embodiment, the programmer may specify two possible actions in response to a TLB miss. If the programmer specifies via TLB_miss_policy field 806 a normal action in response to a TLB miss, then memory subsystem 104 services the stream prefetch TLB miss as it would for other load or store TLB misses, which generates more traffic on processor bus 132, potentially consuming precious microprocessor 100 resources which might otherwise be used for higher priority operations. However, if the programmer specifies an abort action in response to a TLB miss, then memory subsystem 104 aborts the stream prefetch request 136 and does not prefetch the specified cache line into memory subsystem 104, thereby not incurring the overhead associated with servicing the TLB miss. Hence, the TLB_miss_policy parameter 806 provides a means of enabling the programmer to specify the priority of stream prefetch operations relative to other operations in microprocessor 100. The operation of microprocessor 100 based on the TLB_miss_policy field 806 is described in detail below with respect to FIG. 14.

Stream_prefetch_priority_parameters 614 also include a page_fault_policy field 808. Page_fault_policy field 808 specifies the action memory subsystem 104 takes in the event that a page of memory implicated by current_prefetch_address 324 of stream prefetch request 136 is not present in memory, referred to as a page fault, which is an abnormal TLB access. In one embodiment, the value of page_fault_policy field 808 is forwarded to the memory subsystem 104 in stream prefetch request 136. In one embodiment, the programmer may specify two possible actions in response to a page fault. If the programmer specifies via page_fault_policy field 808 a normal action in response to a page fault, then memory subsystem 104 services the stream prefetch page fault as it would for other load or store page faults, which typically results in a relatively huge latency of the operating system fetching the memory page from mass storage in the computer system, such as a disk drive, potentially consuming precious microprocessor 100 resources which might otherwise be used for higher priority operations. However, if the programmer specifies an abort action in response to a page fault, then memory subsystem 104 aborts the stream prefetch request 136 and does not prefetch the specified cache line into memory subsystem 104, thereby not incurring the overhead associated with servicing the page fault. Hence, the page_fault_policy parameter 808 provides a means of enabling the programmer to specify the priority of stream prefetch operations relative to other operations in microprocessor 100. The operation of microprocessor 100 based on the page_fault_policy field 808 is described in detail below with respect to FIG. 15.

Stream_prefetch_priority_parameters 614 also include a protection_fault_policy field 812. Protection_fault_policy field 812 specifies the action memory subsystem 104 takes in the event that the task or process executing the stream prefetch instruction 138 does not have permission to access the location in memory specified by current_prefetch_address 324 of stream prefetch request 136, referred to as a protection fault, which is an abnormal TLB access. In one embodiment, the value of protection_fault_policy field 812 is forwarded to the memory subsystem 104 in stream prefetch request 136. In one embodiment, the programmer may specify two possible actions in response to a protection fault. If the programmer specifies via protection_fault_policy field 812 a normal action in response to a protection fault, then memory subsystem 104 services the stream prefetch protection fault as it would for other load or store protection faults, which typically results in a relatively large latency of the operating system invoking a protection fault service routine and potentially terminating the running program. However, if the programmer specifies an abort action in response to a protection fault, then memory subsystem 104 aborts the stream prefetch request 136 without generating a protection fault to the operating system and does not prefetch the specified cache line into memory subsystem 104. Hence, the protection_fault_policy parameter 812 provides a means of enabling the programmer to specify the priority of stream prefetch operations relative to other operations in microprocessor 100. Furthermore, protection_fault_policy parameter 812 advantageously provides a means of enabling the programmer to specify that the data stream prefetch is allowed to be speculative in nature. For example, a program might specify in the stream prefetch instruction 138 a data stream to be prefetched that is larger than what is ultimately consumed by the program because the programmer was not sure of the run-time data stream size at the time the stream prefetch instruction 138 is executed. However, the programmer still wants to take maximum advantage of prefetching in the case the run-time data stream turns out to be large. Thus the programmer may optimistically specify a large data stream via the stream descriptor 600 that runs over his task's valid memory space. In this case the programmer would not want to take a protection fault, which could result in the operating system killing the task unnecessarily. Hence, the protection_fault_policy parameter 812 advantageously allows the programmer more freedom in specifying speculative prefetch streams. The operation of microprocessor 100 based on the protection_fault_policy field 812 is described in detail below with respect to FIG. 16.

Stream_prefetch_priority_parameters 614 also include a stream_prefetch_priority field 814. Stream_prefetch_priority field 814 specifies the priority to be given to processor bus 132 transactions associated with stream prefetch request 136 relative to other processor bus 132 transactions. In one embodiment, memory subsystem 104 uses stream_prefetch_priority field 814 in conjunction with a task priority to determine how to schedule competing processor bus 132 transaction requests. That is, the operating system loads a task priority into microprocessor 100 (such as in a system register in register file 124 or in a memory management unit of microprocessor 100) for each task currently executing in microprocessor 100. When instruction decode/dispatch unit 122 of FIG. 1 dispatches a load, store, or stream prefetch instruction, it issues the task priority of the task executing the instruction along with the instruction for use by the load/store unit 116, stream prefetch unit 118, memory subsystem 104, and bus interface unit 102 to prioritize competing processor bus 132 transaction requests. In one embodiment, stream prefetch request 136 includes the value of stream_prefetch_priority indicator 814 for use by memory subsystem 104 so that memory subsystem 104 can communicate to bus interface unit 102 the relative priority of a bus request issued by memory subsystem 104 to bus interface unit 102 in response to the stream prefetch request 136, thereby enabling arbiter 142 of FIG. 1 to properly prioritize the stream prefetch bus request relative to other bus requests in request queue 144 of FIG. 1. The stream_prefetch_priority field 814 advantageously enables a programmer to allocate the usage of bandwidth on processor bus 132 to stream prefetches appropriately, which may be very helpful toward improving performance, since there may be an abundance or shortage of processor bus 132 bandwidth available at different times due to other activity within microprocessor 100.

In one embodiment, stream_prefetch_priority field 814 may be one of four possible values, as follows. A value of 0 corresponds to a maximum priority, and instructs microprocessor 100 to schedule the bus request associated with the stream prefetch request 136 for the requesting stream prefetch engine 202 in front of loads and stores from lower priority tasks, in front of stream prefetch requests from all other stream prefetch engines 202, and behind loads and stores from higher priority tasks. A value of 1 corresponds to a high priority, and instructs microprocessor 100 to schedule the bus request associated with the stream prefetch request 136 for the requesting stream prefetch engine 202 in front of stream prefetch requests from other medium priority stream prefetch engines 202, round-robin with other high-priority stream prefetch engines 202, and behind loads and stores from all other tasks. A value of 2 corresponds to a medium priority, and instructs microprocessor 100 to schedule the bus request associated with the stream prefetch request 136 for the requesting stream prefetch engine 202 round-robin with stream prefetch requests from other medium priority stream prefetch engines 202, and behind loads and stores from all other tasks. A value of 3 corresponds to a low priority, and instructs microprocessor 100 to schedule the bus request associated with the stream prefetch request 136 for the requesting stream prefetch engine 202 behind all stream prefetch requests from all other stream prefetch engines 202, and behind loads and stores from all other tasks.

Stream_prefetch_priority_parameters 614 also include a load/store_monitor_policy field 816. Load/store_monitor_policy field 816 specifies whether stream prefetch engine 202 monitors load/store request 134 for loads, stores, or both to determine whether a hit in the data stream has occurred. In one embodiment, a value of 0 instructs stream prefetch engine 202 to monitor loads; a value of 1 instructs stream prefetch engine 202 to monitor stores; a value of 2 instructs stream prefetch engine 202 to monitor both loads and stores.

Stream_prefetch_priority_parameters 614 also include a stream_prefetch_hysteresis field 818. Stream_prefetch_hysteresis field 818 specifies the minimum number of bytes to prefetch whenever stream prefetching is resumed, i.e., whenever stream prefetching is triggered by a load/store request 134 hit in the data stream within the stream_fetch-ahead_distance 612 of the current_prefetch_addr 324. Use of the stream_prefetch_hysteresis field 818 is described in detail below with respect to FIG. 13.

Stream_prefetch_priority_parameters 614 also include a speculative_stream_hit_policy field 822. Speculative_stream_hit_policy field 822 enables the programmer to specify whether the stream prefetch engine 202 should trigger prefetching of the data stream, as in decision block 1114 of FIG. 11, if the load or store that hit in the data stream is a speculative load or store instruction. In one embodiment, if the speculative_stream_hit_policy field 822 is 0, then data stream prefetching is triggered, and if the speculative_stream_hit_policy field 822 is 1, then data stream prefetching is not triggered. A speculative load or store instruction is a load or store instruction that is speculatively executed, i.e., is not guaranteed to complete. Typically an instruction is speculative because it was executed based on a branch prediction made by the microprocessor 100 that may later be discovered to have been incorrect and require correction by flushing all of the speculatively executed instructions.

Referring now to FIG. 9, a block diagram illustrating an example data stream template 904 specified by a stream descriptor 600 of FIG. 6 according to the present invention is shown. FIG. 9 shows system memory 902, which includes a stream template 904 within a subset of the system memory 902 address space. The stream template 904 is exploded in FIG. 9 to show an example stream template 904 having nine stream blocks 906. One of the stream blocks is exploded to show that the length of a stream block 906 is defined by the stream_block_size 608. For example, a programmer might specify the stream block 906 of FIG. 9 by the stream_block_size field 608 to be 120 bytes in length. The beginning of the data stream template 904 is shown marked by the stream_base 602 of FIG. 6. Additionally, the end address of the data stream template 904 is indicated by the distance covered by the stream_length 604 of FIG. 6 from the stream_base 602. FIG. 9 also illustrates the stream_block_stride 606 of FIG. 6 as the distance between the beginning of one stream block 906 and the beginning of the next stream block 906. FIG. 9 also illustrates an example stream_fetch-ahead_distance 612 of FIG. 6 as three stream_block_strides 606 worth of bytes.

Referring now to FIG. 10, a block diagram illustrating conditions which selectively trigger prefetching of a data stream with the stream template example of FIG. 9 according to the present invention is shown. FIG. 10 shows two situations. In each of the situations, the current_prefetch_addr 324 of FIG. 3 specifies an address within the seventh stream block 906. Consequently, the beginning of the stream_fetch-ahead_distance 612 is shown specifying an address within the fourth stream block 906, since the stream_fetch-ahead_distance 612 in the example of FIG. 9 is three stream_block_strides 606. In situation #1, the current_stream_hit_addr 322 of FIG. 3 specifies an address within the second stream block 906. Hence, the current_fetch-ahead_distance 344 is six stream blocks 906, as shown. Consequently, the corresponding stream prefetch engine 202 of FIG. 2 remains suspended since the current_fetch-ahead_distance 344 is greater than the stream_fetch-ahead_distance 612. In situation #2, the current_stream_hit_addr 322 of FIG. 3 specifies an address within the fifth stream block 906. Hence, the current_fetch-ahead_distance 344 is two stream blocks 906, as shown.

Consequently, the corresponding stream prefetch engine 202 of FIG. 2 resumes prefetching of the specified data stream since the current_fetch-ahead_distance 344 is less than the stream_fetch-ahead_distance 612, i.e., prefetching of the data stream is triggered by the detection of current_stream_hit_addr 322 within the stream_fetch-ahead_distance 612. This operation is described in detail with respect to FIGS. 11 through 13 below.

Figure 11:
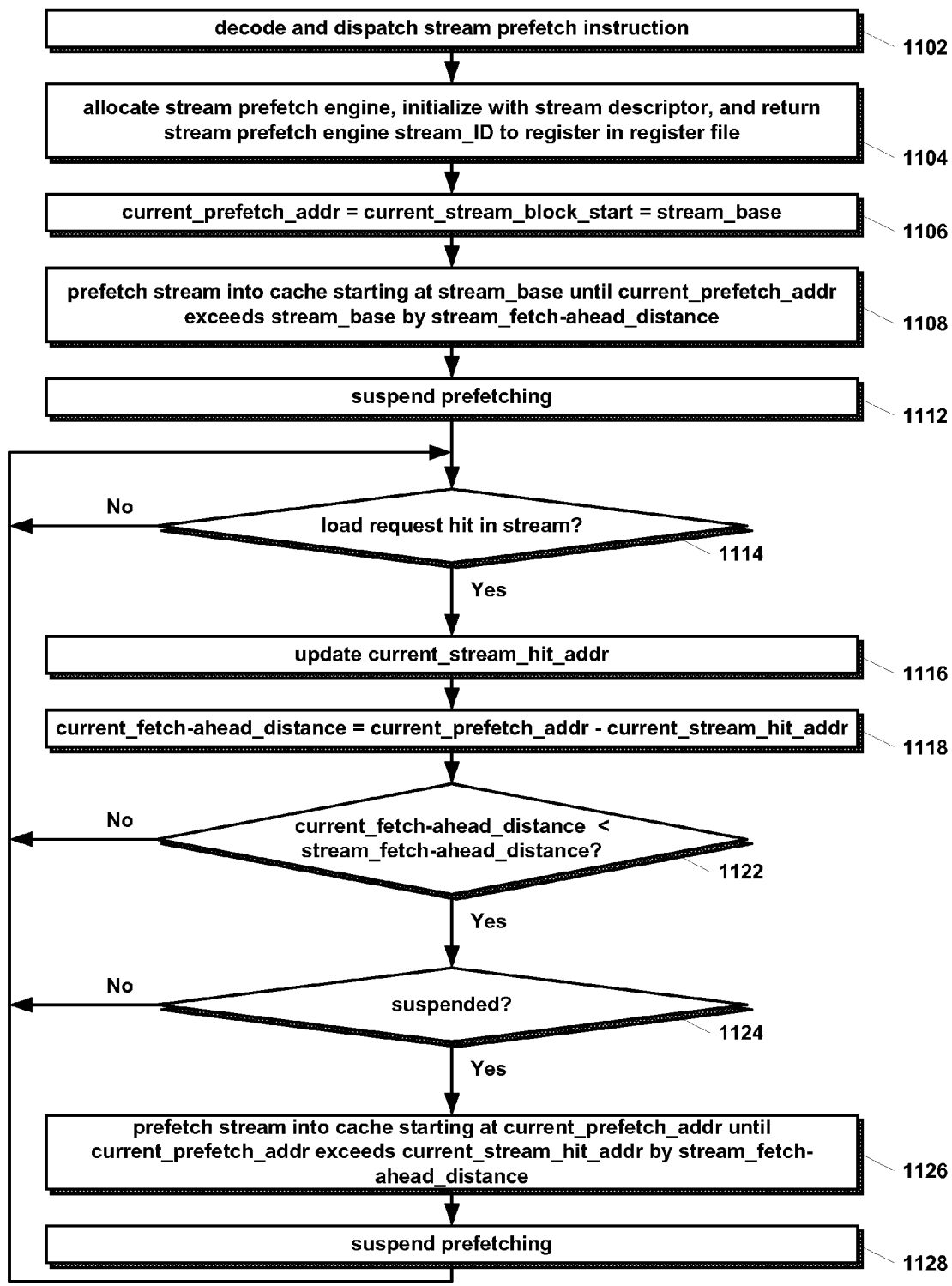
FIG. 11 is a flowchart illustrating stream prefetching according to the present invention.

Referring now to FIG. 11, a flowchart illustrating stream prefetching according to the present invention is shown. Flow begins a block 1102.

At block 1102, instruction decode/dispatch unit 122 decodes and dispatches a stream prefetch instruction 138 to stream prefetch unit 118 of FIG. 1. Flow proceeds to block 1104.

At block 1104, stream engine allocator 204 of FIG. 2 receives the stream prefetch instruction 138, allocates one of the stream prefetch engines 202 of FIG. 2, and initializes the allocated stream prefetch engine 202 with the stream descriptor 600 of stream prefetch instruction 138. In particular, the stream descriptor 600 is loaded into stream descriptor registers 362 of FIG. 3. Additionally, the stream_ID of the allocated stream prefetch engine 202 is returned to a predetermined general purpose register of register file 124 of FIG. 1. If none of the stream prefetch engines 202 are free for allocation, then the stream prefetch instruction 138 returns a 0 stream_ID value; otherwise, the stream prefetch instruction 138 returns a stream_ID value identifying the allocated stream prefetch engine 202. Flow proceeds to block 1106.

At block 1106, control logic 334 of FIG. 3 loads the stream_base 602 from stream_base register 302 into current_prefetch_addr register 324 and current_stream_block_start register 326. Flow proceeds to block 1108.

At block 1108, control logic 334 begins prefetching the data stream into memory subsystem 104 as specified by the stream descriptor 600 until the current_prefetch_addr register 324 exceeds the stream_base register 302 value by the stream_fetch-ahead_distance register 312 value. That is, control logic 334 continuously and asynchronously issues stream prefetch requests 136 to memory subsystem 104 following the data stream template described in the stream descriptor 600 and updating the current_prefetch_addr register 324 until the current_prefetch_addr register 324 exceeds the stream_base register 302 value by the stream_fetch-ahead_distance register 312 value. Flow proceeds to block 1112.

At block 1112, control logic 334 suspends prefetching of the data stream. That is, control logic 334 stops issuing stream prefetch request 136 to memory subsystem 104 and begins monitoring load/store requests 134. Flow proceeds to decision block 1114.

At decision block 1114, control logic 334 determines whether a load/store request 134 has been issued and if so, whether the load/store request 134 hits in the data stream. That is, control logic 334 examines hit_in_stream signal 342 to determine whether the load/store request 134 hit in the data stream. Additionally, control logic 334 examines load/store request 134 to determine whether the load/store request 134 was of the type being monitored. That is, although FIG. 11 states a determination is made whether a load request hits in the data stream, it is understood that control logic 334 determines whether the load/store request 134 was a load, or a store, or either, depending upon the monitoring policy. In one embodiment, control logic 334 monitors only load requests. In one embodiment, control logic 334 monitors only store requests. In one embodiment, control logic 334 monitors both load and store requests. In one embodiment, control logic 334 monitors requests based on the type specified by the programmer in load/store_monitor_policy field 816 of FIG. 8 of stream descriptor 600 stored in stream_prefetch_priority_parameters register 314, as described above with respect to FIG. 8. Additionally, in one embodiment, control logic 334 examines load/store request 134 to determine whether the load/store request 134 was speculative and whether the speculative_stream_hit_policy field 822 specifies a policy of triggering on speculative stream hits. If a load/store request 134 of a monitored type hits in the data stream, flow proceeds to block 1116; otherwise, flow returns to decision block 1114 to monitor the next load/store request 134.

At block 1116, control logic 334 updates current_stream_hit_addr 322 with the address of load/store request 134 that hit in the data stream as determined at decision block 1114. Flow proceeds to block 1118.

At block 1118, subtractor 352 calculates the current_fetch-ahead_distance 344 of FIG. 3 by subtracting the current_stream_hit_addr 322 from the current_prefetch_addr 324. Flow proceeds to decision block 1122.

At decision block 1122, control logic 334 determines whether the current_fetch-ahead_distance 344 is less than the stream_fetch-ahead_distance 612 stored in stream_fetch-ahead distance register 312. If so, flow proceeds to decision block 1124; otherwise, flow returns to decision block 1114 to monitor the next load/store request 134.

At decision block 1124, control logic 334 determines whether prefetching of the data stream is currently suspended. In one embodiment, control logic 334 maintains state that specifies whether stream prefetching is currently suspended or resumed. If prefetching of the data stream is suspended, flow proceeds to block 1126; otherwise, flow returns to decision block 1114 to monitor the next load/store request 134, since stream prefetching is already in progress.

At block 1126, control logic 334 resumes prefetching the data stream into memory subsystem 104 as specified by the stream descriptor 600 until the current_prefetch_addr register 324 exceeds the current_stream_hit_addr register 322 value by the stream_fetch-ahead_distance register 312 value. Block 1126 is described in more detail with respect to FIGS. 12 and 13 below. Flow proceeds to block 1128.

At block 1128, control logic 334 suspends prefetching of the data stream. Flow returns to decision block 1114 to monitor the next load/store request 134. If the programmer specifies a stream_length 604 value of 0, then the data stream is unbounded, and the stream prefetch engine 202 continues synchronously prefetching the data stream as shown in FIG. 11 until halted by execution of a halt stream 700 instruction; however, if the programmer specifies a non-zero stream_length 604 value then flow ends once the current_prefetch_addr 324 reaches the end of the data stream. Because the stream prefetch engine 202 does not continuously generate stream prefetch requests 136, but instead advantageously only generates stream prefetch requests 136 synchronized with program load instruction execution (or stores or both) based on the specified stream_fetch-ahead distance 612 as described herein, specifying an unbounded stream does not have the problems suffered by traditional stream prefetch solutions of wasting memory bandwidth or prematurely evicting more useful data from the cache, thereby polluting the cache with unneeded data.

Figure 12:
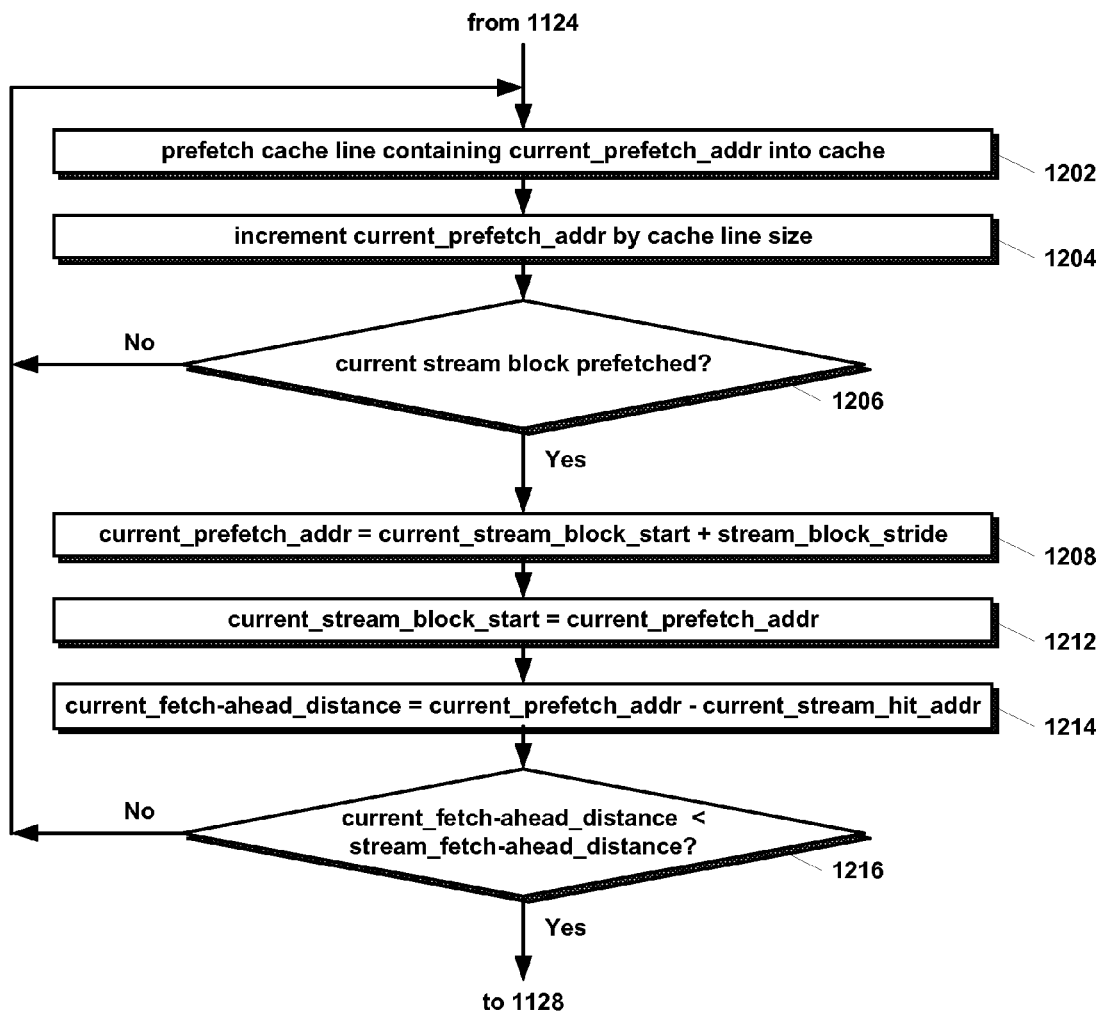
FIG. 12 is a flowchart illustrating in detail block 1126 of FIG. 11 according to the present invention.

Referring now to FIG. 12, a flowchart illustrating in detail block 1126 of FIG. 11 according to the present invention is shown. Flow proceeds to block 1202 from decision block 1124 of FIG. 11.

At block 1202, control logic 334 generates a stream prefetch request 136 to memory subsystem 104 to prefetch a cache line containing current_prefetch_addr 324 into memory subsystem 104; memory subsystem 104 generates a request to bus interface unit 102 to prefetch the cache line into memory subsystem 104; and bus interface unit 102 generates a transaction on processor bus 132 to prefetch the cache line into memory subsystem 104. However, if current_prefetch_addr 324 hits in memory subsystem 104, then memory subsystem 104 does not generate the request to bus interface unit 102 to prefetch the cache line. Flow proceeds to block 1204.

At block 1204, control logic 334 increments the current_prefetch_addr register 324 by the cache line size. Flow proceeds to decision block 1206.

At decision block 1206, control logic 334 determines whether the current stream block has been prefetched. If so, flow proceeds to block 1208; otherwise, flow returns to block 1202.

At block 1208, control logic 334 updates current_prefetch_addr register 324 with the sum of the contents of current_stream_block_start register 326 and stream_block_stride register 306. Flow proceeds to block 1212.

At block 1212, control logic 334 updates current_stream_block_start register 326 with the value in current_prefetch_addr register 324. Flow proceeds to block 1214.

At block 1214, subtractor 352 calculates the current_fetch-ahead_distance 344 of FIG. 3 by subtracting the current_stream_hit_addr 322 from the current_prefetch_addr 324. Flow proceeds to decision block 1216.

At decision block 1216, control logic 334 determines whether the current_fetch-ahead_distance 344 is less than the stream_fetch-ahead_distance 612 stored in stream_fetch-ahead distance register 312. If so, flow proceeds to block 1128 of FIG. 11; otherwise, flow returns to block 1202.

Figure 13:
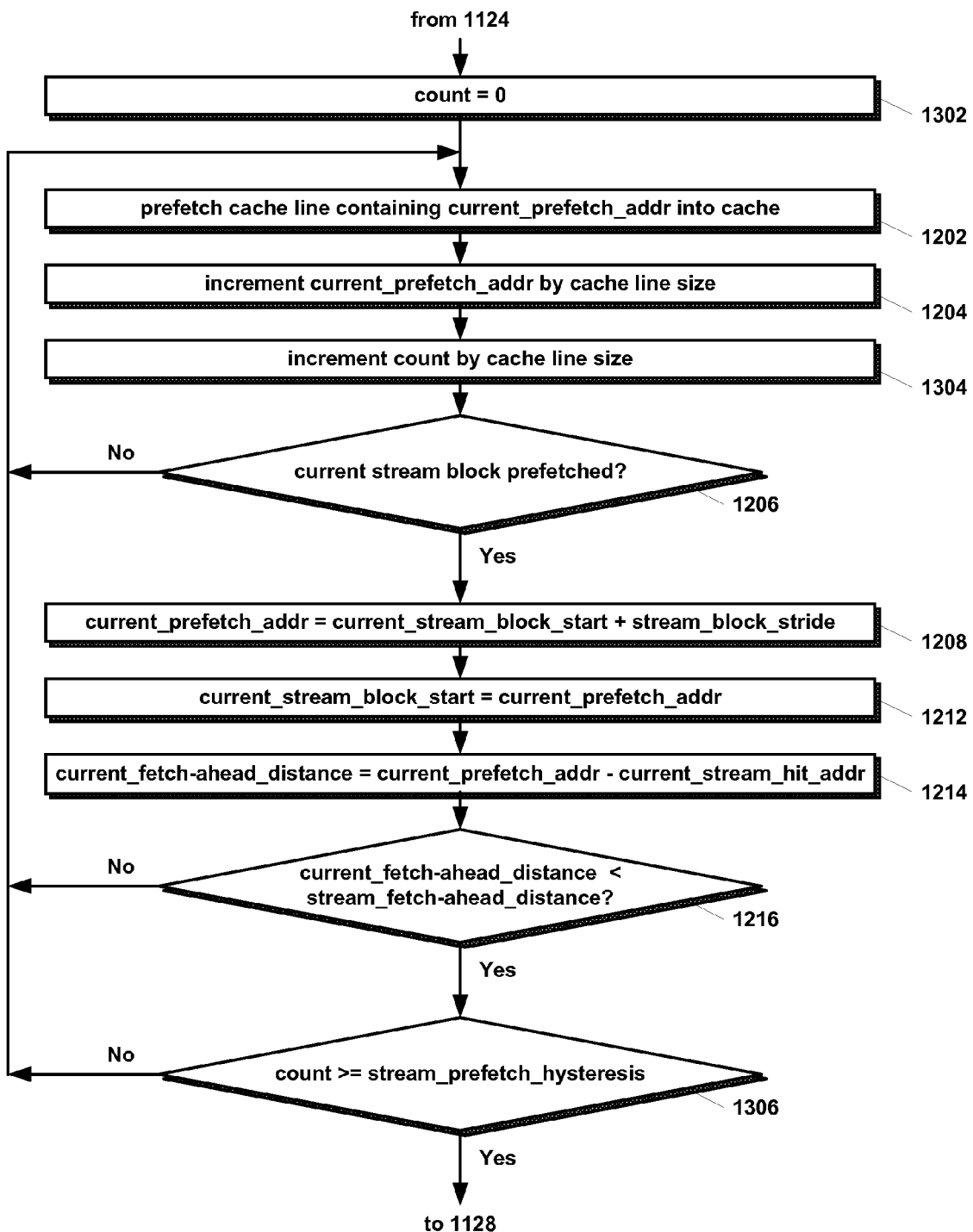
FIG. 13 is a flowchart illustrating in detail block 1126 of FIG. 11 according to an alternate embodiment of the present invention.

Referring now to FIG. 13, a flowchart illustrating in detail block 1126 of FIG. 11 according to an alternate embodiment of the present invention is shown. The embodiment of FIG. 13 employs the stream_prefetch_hysteresis parameter 818 of FIG. 8. FIG. 13 is similar to FIG. 12 and like numbered blocks are the same. However, FIG. 13 also includes three additional blocks—1302, 1304, and decision block 1306—which are described below. Flow proceeds to block 1302 from decision block 1124 of FIG. 11.

At block 1302, control logic 334 initializes a byte count to 0. Flow proceeds to block 1202.

At block 1202, control logic 334 generates a stream prefetch request 136 to memory subsystem 104 to prefetch a cache line containing current_prefetch_addr 324 into memory subsystem 104; memory subsystem 104 generates a request to bus interface unit 102 to prefetch the cache line into memory subsystem 104; and bus interface unit 102 generates a transaction on processor bus 132 to prefetch the cache line into memory subsystem 104. However, if current_prefetch_addr 324 hits in the specified cache of memory subsystem 104, then memory subsystem 104 does not generate the request to bus interface unit 102 to prefetch the cache line. Flow proceeds to block 1204.

At block 1204, control logic 334 increments the current_prefetch_addr register 324 by the cache line size. Flow proceeds to block 1304.

At block 1304, control logic 334 increments the byte count by the size of a cache line. Flow proceeds to decision block 1206.

At decision block 1206, control logic 334 determines whether the current stream block has been prefetched. If so, flow proceeds to block 1208; otherwise, flow returns to block 1202.

At block 1208, control logic 334 updates current_prefetch_addr register 324 with the sum of the contents of current_stream_block_start register 326 and stream_block_stride register 306. Flow proceeds to block 1212.

At block 1212, control logic 334 updates current_stream_block_start register 326 with the value in current_prefetch_addr register 324. Flow proceeds to block 1214.

At block 1214, subtractor 352 calculates the current_fetch-ahead_distance 344 of FIG. 3 by subtracting the current_stream_hit_addr 322 from the current_prefetch_addr 324. Flow proceeds to decision block 1216.

At decision block 1216, control logic 334 determines whether the current_fetch-ahead_distance 344 is less than the stream_fetch-ahead_distance 612 stored in stream_fetch-ahead distance register 312. If so, flow proceeds to decision block 1306; otherwise, flow returns to block 1202.

At decision block 1306, control logic 334 determines whether the byte count is greater than or equal to the stream_prefetch_hysteresis parameter 818 stored in stream_prefetch_priority_parameters register 314. If so, flow proceeds to block 1128 of FIG. 11; otherwise, flow returns to block 1202.

As may be seen from FIG. 13, the stream_prefetch_hysteresis field 818 enables the programmer to specify a minimum amount of the data stream to prefetch in a chunk, which is advantageous because it potentially enables bus interface unit 102 to combine multiple smaller stream prefetch requests 136 into one or more larger bus transaction requests on processor bus 132, thereby more efficiently using processor bus 132 and system memory bandwidth.

The prefetching of the data stream that is synchronized with program execution of loads, stores, or both, advantageously avoids some of the disadvantages of a stream prefetch instruction that does not have any hardware means of synchronizing with program execution. In particular, a traditional stream prefetch solution can easily get too far ahead of, i.e., overrun, the program execution, causing prefetched portions of the data stream to get evicted from the cache or become stale before the program has a chance to consume it. This phenomenon not only destroys the effectiveness of the stream prefetch, but potentially reduces performance rather than improving it by wasting memory bandwidth and prematurely evicting more useful data from the cache, thereby polluting the cache with unneeded data. However, as may be seen from FIGS. 10 through 13, stream hit detector 332 of FIG. 3 advantageously detects loads (or stores or both, depending on the monitoring policy, which in one embodiment is defined by the value of load/store_monitor_policy field 816 discussed above) that hit anywhere within the specified data stream template, and control logic 334 of FIG. 3 uses the hit information to determine whether the hit is within the stream_fetch-ahead_distance 612. The data stream hit detection is used to synchronize suspension and resumption of data stream prefetching as described herein.

Figure 14:
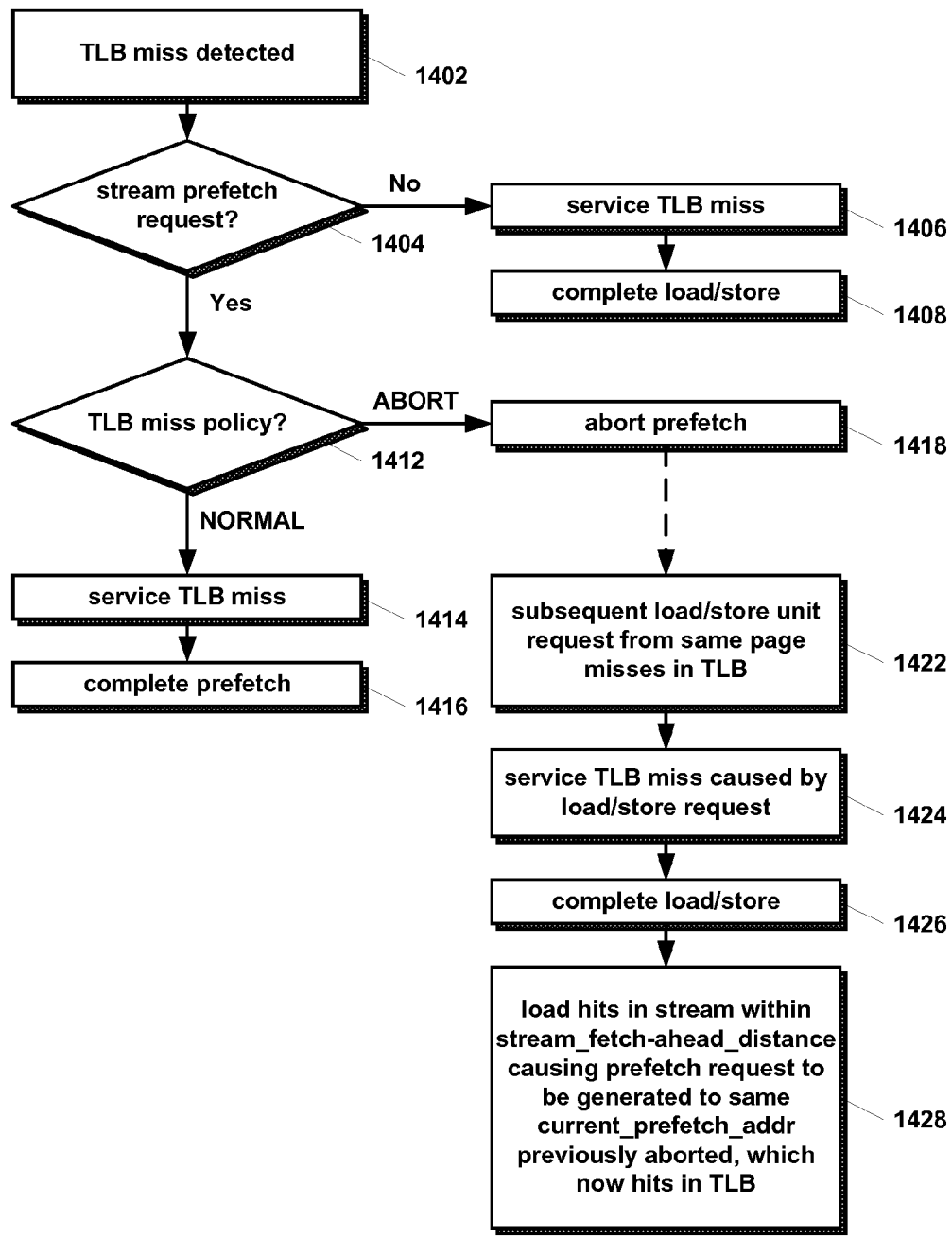
FIG. 14 is a flowchart illustrating operation of the microprocessor in response to a TLB miss in the memory subsystem of a stream prefetch request of FIG. 1 according to the present invention.

Referring now to FIG. 14, a flowchart illustrating operation of microprocessor 100 in response to an abnormal TLB access, in particular a TLB miss in memory subsystem 104 of a stream prefetch request 136 of FIG. 1 according to the present invention is shown. Flow begins at block 1402.

At block 1402, memory subsystem 104 detects a miss in one of the TLBs of memory subsystem 104. Flow proceeds to decision block 1404.

At decision block 1404, memory subsystem 104 determines whether the TLB miss detected in block 1402 was caused by a stream prefetch request 136, or whether the TLB miss was caused by a load/store request 134. If by a stream prefetch request 136, flow proceeds to decision block 1412; otherwise, the TLB miss was caused by a load/store request 134, and flow proceeds to block 1406.

Figure 17:
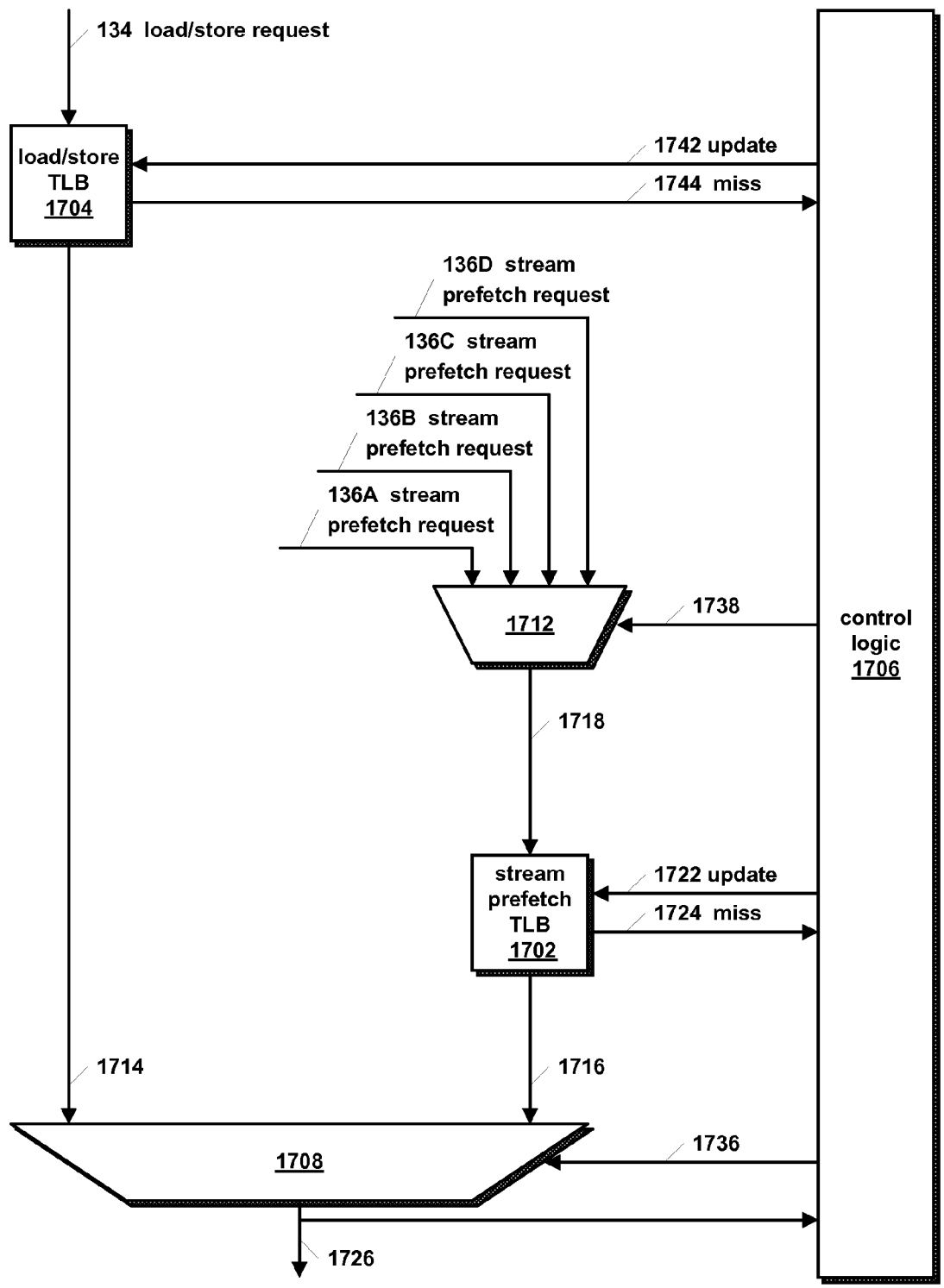
FIG. 17 is a block diagram of portions of the memory subsystem of FIG. 1 having a separate stream prefetch TLB according to the present invention.
Figure 18:
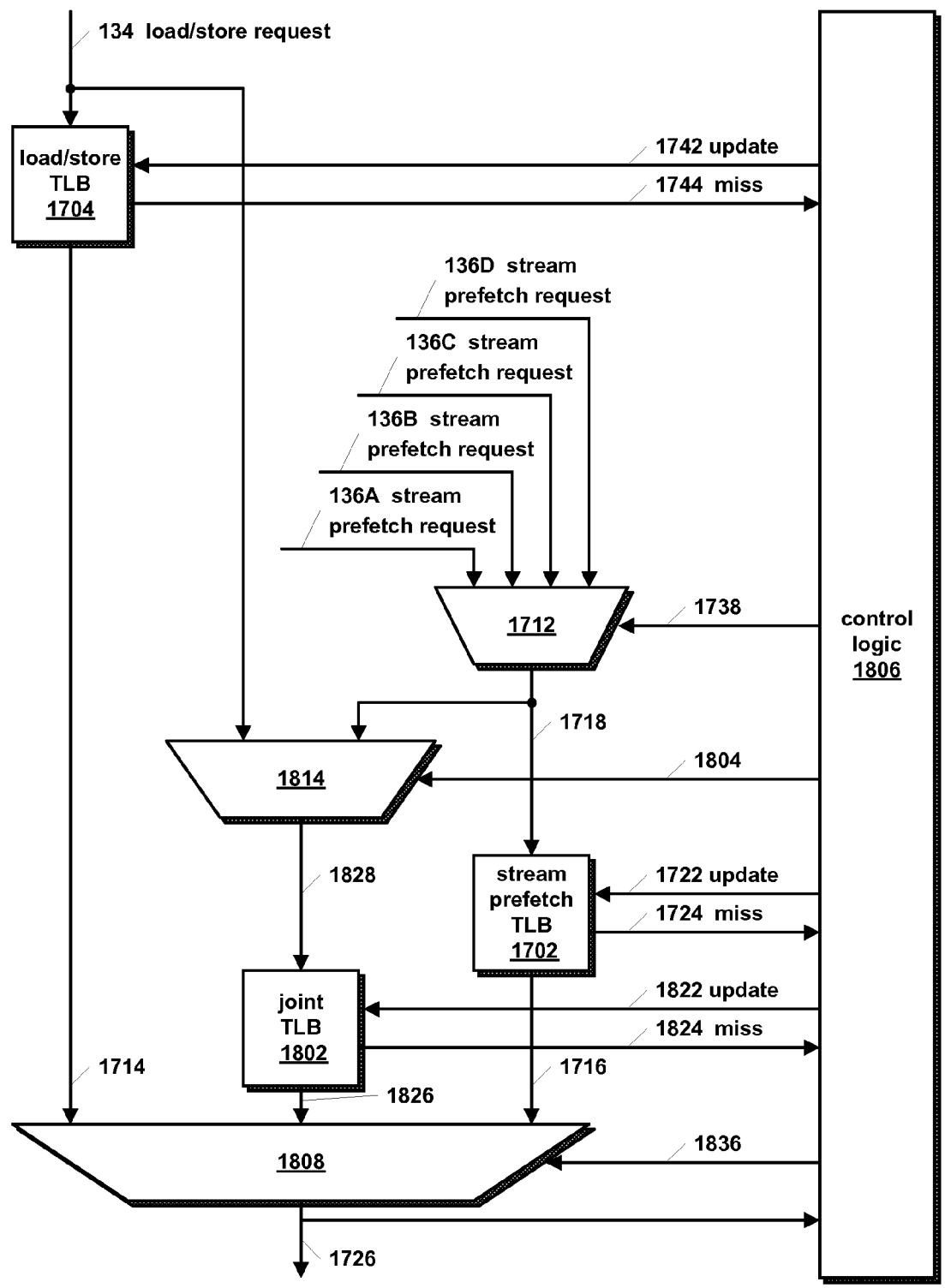
FIG. 18 is a block diagram of portions of the memory subsystem of FIG. 1 having a separate stream prefetch TLB according to an alternate embodiment of the present invention.
Figure 19:
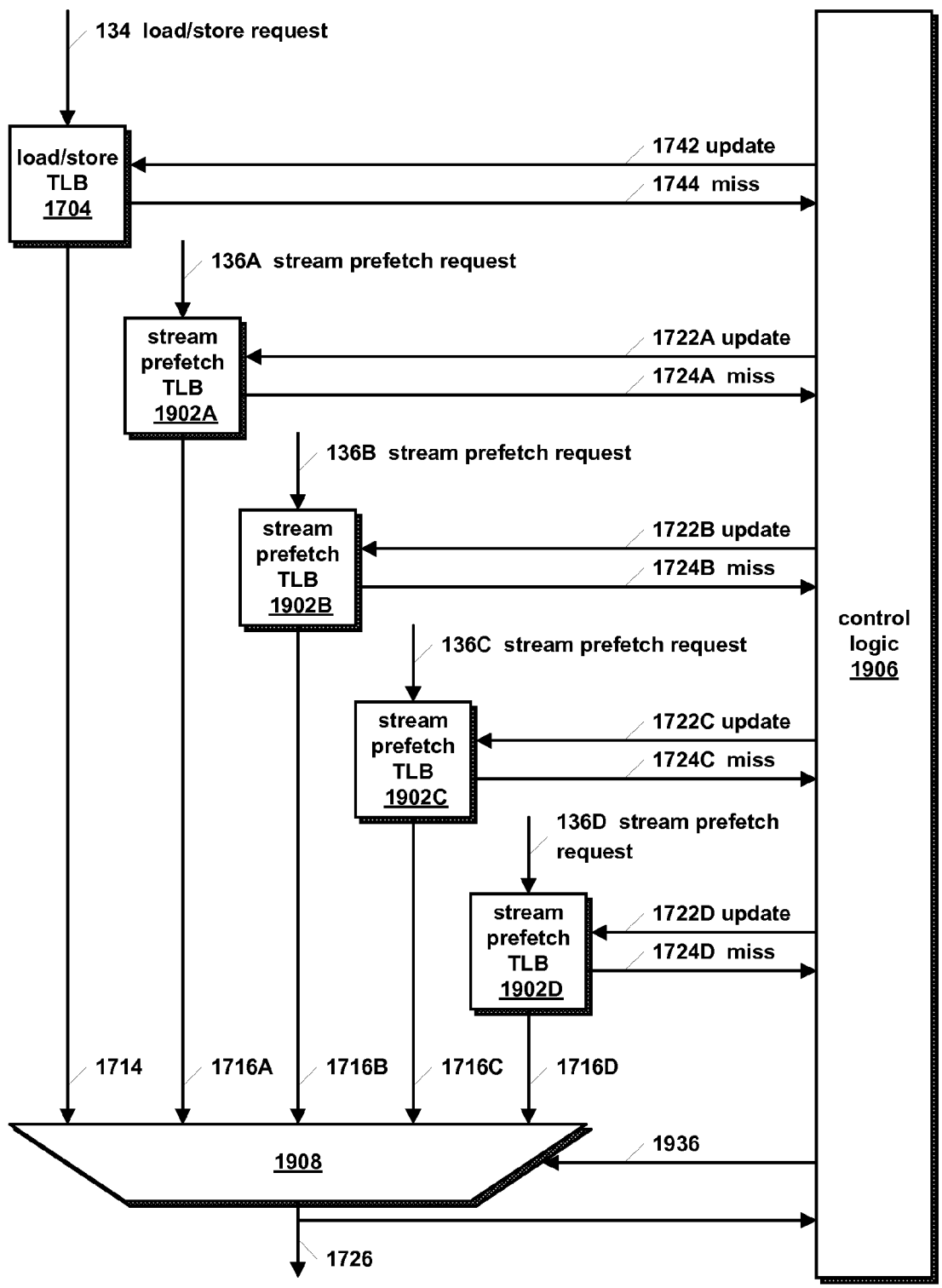
FIG. 19 is a block diagram of portions of the memory subsystem of FIG. 1 having a separate stream prefetch TLB according to an alternate embodiment of the present invention.

At block 1406, memory subsystem 104 services the TLB miss by fetching from the system memory the missing TLB information and updating the TLB therewith. In the embodiment having a unified TLB, memory subsystem 104 updates the unified TLB. In the embodiment of FIGS. 17 through 19, memory subsystem 104 updates load/store TLB 1704. Flow proceeds to block 1408.

At block 1408, memory subsystem 104 completes the load/store request 134 since the TLB information is now in the TLB. Flow ends at block 1408.

At decision block 1412, memory subsystem 104 determines what the policy is for a TLB miss generated by a stream prefetch request 136. In the embodiment of FIG. 18 or an embodiment in which memory subsystem 104 employs a unified TLB for load/store requests 134 and stream prefetch requests 136, memory subsystem 104 determines the TLB miss policy for stream prefetch requests by examining TLB_miss_policy parameter 806 of FIG. 8 specified in stream descriptor 600 and stored in stream_prefetch_priority_parameters register 314 and forwarded to memory subsystem 104 in stream prefetch request 136 to determine whether the policy is to abort the stream prefetch request 136 or to handle the stream prefetch request 136 normally like any other load/store request 134. In the embodiments of FIG. 17 and FIG. 19, memory subsystem 104 employs a normal TLB miss policy, since a load/store request 134 missing in load/store TLB 1704 will not populate the relevant stream prefetch TLB 1702 or 1902A-D. If the TLB miss policy is an abort policy, then flow proceeds to block 1418; otherwise, flow proceeds to block 1414.

At block 1414, memory subsystem 104 services the TLB miss by fetching from the system memory the missing TLB information and updating the TLB therewith. In the embodiment having a unified TLB, memory subsystem 104 updates the unified TLB. In the embodiment of FIGS. 17 through 19, memory subsystem 104 updates the relevant stream prefetch TLB 1702 or 1902A-D. Flow proceeds to block 1416.

At block 1416, memory subsystem 104 completes the stream prefetch request 136 since the TLB information is now in the TLB. Flow ends at block 1416.

At block 1418, memory subsystem 104 aborts the stream prefetch request 136 without updating the TLB with the missing information. Flow proceeds to block 1422. The dotted line from block 1418 to block 1422 in FIG. 14 denotes that block 1422 follows block 1418, but is asynchronous to aborting the stream prefetch request 136.

At block 1422, a load/store unit 116 subsequently generates a load/store request 134 to the same memory page implicated by the aborted stream prefetch request 136, and the load/store request 134 also misses in the TLB. Flow proceeds to block 1424.

At block 1424, memory subsystem 104 services the TLB miss caused by the load/store request 134 by fetching from the system memory the missing TLB information and updating the TLB therewith. In the embodiment having a unified TLB, memory subsystem 104 updates the unified TLB. In the embodiment of FIGS. 17 and 19, block 1424 is not relevant. In the embodiment of FIG. 18, memory subsystem 104 updates joint TLB 1802. Flow proceeds to block 1426.

At block 1426, memory subsystem 104 completes the load/store request 134 since the TLB information is now in the TLB. Flow proceeds to block 1428.

At block 1428, stream prefetch engine 202 detects that a subsequent load/store request 134 hits in the data stream that is within the stream_fetch-ahead_distance 612, as determined at blocks 1114 through 1124 of FIG. 11, causing stream prefetch engine 202 to resume prefetching, according to block 1126 of FIG. 11, and in particular, to generate a stream prefetch request 136 to the same current_prefetch_addr 324 that missed in the TLB according to block 1402, but which now hits in the TLB since the TLB was previously populated with the missing TLB information according to block 1424. Flow ends at block 1428.

Figure 15:
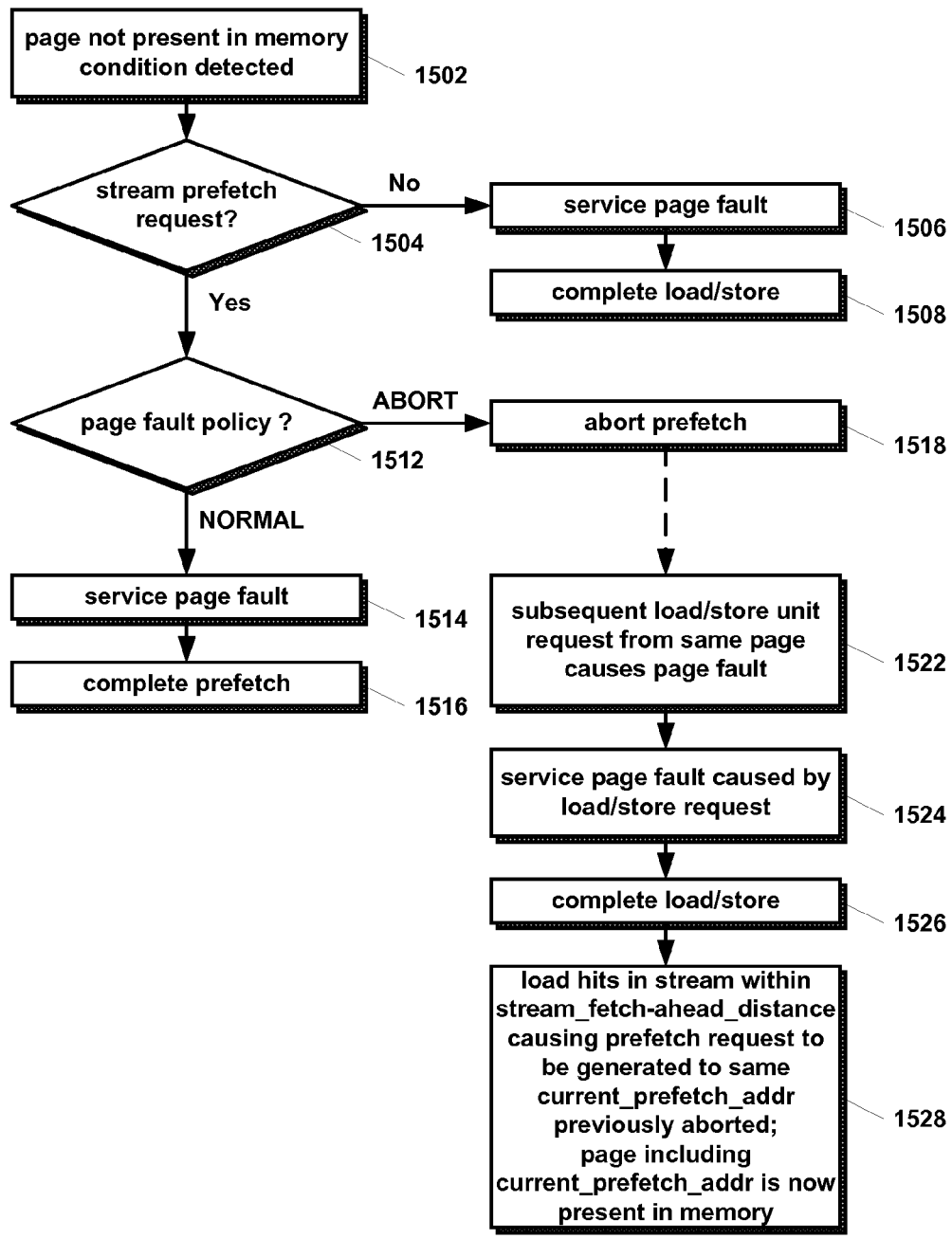
FIG. 15 is a flowchart illustrating operation of the microprocessor in response to a page fault caused by a stream prefetch request of FIG. 1 according to the present invention.

Referring now to FIG. 15, a flowchart illustrating operation of microprocessor 100 in response to an abnormal TLB access, in particular a page fault caused by a stream prefetch request 136 of FIG. 1 according to the present invention is shown. It is noted that typically a TLB miss occurs prior to a page fault. Flow begins at block 1502.

At block 1502, memory subsystem 104 detects a condition in which a requested memory page is not present in system memory. Flow proceeds to decision block 1504.

At decision block 1504, memory subsystem 104 determines whether the page fault detected in block 1502 was caused by a stream prefetch request 136, or whether the page fault was caused by a load/store request 134. If by a stream prefetch request 136, flow proceeds to decision block 1512; otherwise, the page fault was caused by a load/store request 134, and flow proceeds to block 1506.

At block 1506, microprocessor 100 notifies the operating system of the page fault, and the operating system fetches the missing page from a mass storage device into the system memory. Flow proceeds to block 1508.

At block 1508, memory subsystem 104 completes the load/store request 134 since the page is now in the system memory. Flow ends at block 1508.

At decision block 1512, memory subsystem 104 determines what the policy is for a page fault generated by a stream prefetch request 136. In one embodiment, the page fault policy is always to abort the stream prefetch request 136. In another embodiment, memory subsystem 104 determines the page fault policy for stream prefetch requests by examining page_fault_policy parameter 808 of FIG. 8 specified in stream descriptor 600 and stored in stream_prefetch_priority_parameters register 314 and forwarded to memory subsystem 104 in stream prefetch request 136 to determine whether the policy is to abort the stream prefetch request 136 or to handle the stream prefetch request 136 normally like any other load/store request 134. If the page fault policy is to abort, then flow proceeds to block 1518; otherwise, flow proceeds to block 1514.

At block 1514, microprocessor 100 notifies the operating system of the page fault, and the operating system fetches the missing page from a mass storage device into the system memory. Flow proceeds to block 1516.

At block 1516, memory subsystem 104 completes the stream prefetch request 136 since the missing page is now in the system memory. Flow ends at block 1516.

At block 1518, memory subsystem 104 aborts the stream prefetch request 136 without notifying the operating system of the page fault. Flow proceeds to block 1522. The dotted line from block 1518 to block 1522 in FIG. 14 denotes that block 1522 follows block 1518, but is asynchronous to aborting the stream prefetch request 136.

At block 1522, a load/store unit 116 subsequently generates a load/store request 134 to the same memory page implicated by the aborted stream prefetch request 136, and the load/store request 134 also generates a page fault. Flow proceeds to block 1524.

At block 1524, microprocessor 100 notifies the operating system of the page fault, and the operating system fetches the missing page from a mass storage device into the system memory. Flow proceeds to block 1526.

At block 1526, memory subsystem 104 completes the load/store request 134 since the missing page is now in the system memory. Flow proceeds to block 1528.

At block 1528, stream prefetch engine 202 detects that a subsequent load/store request 134 hits in the data stream that is within the stream_fetch-ahead_distance 612, as determined at blocks 1114 through 1124 of FIG. 11, causing stream prefetch engine 202 to resume prefetching, according to block 1126 of FIG. 11, and in particular, to generate a stream prefetch request 136 to the same current_prefetch_addr 324 that generated the page fault according to block 1502, but for which the implicated page is now in system memory since the missing page was brought into the system memory according to block 1524. Flow ends at block 1528.

Figure 16:
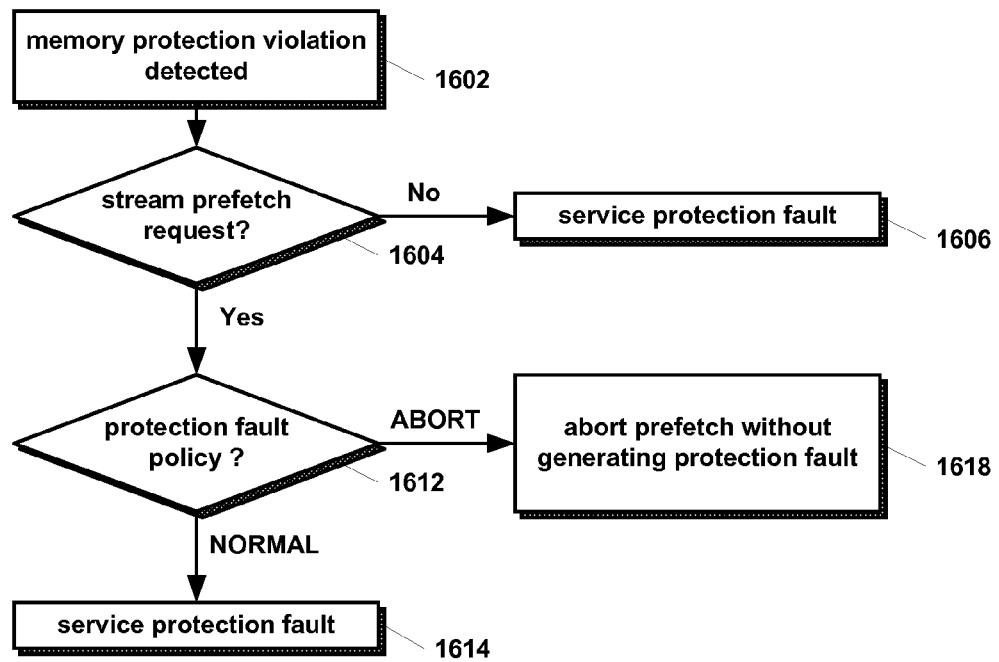
FIG. 16 is a flowchart illustrating operation of the microprocessor in response to a protection fault caused by a stream prefetch request of FIG. 1 according to the present invention.

Referring now to FIG. 16, a flowchart illustrating operation of microprocessor 100 in response to an abnormal TLB access, in particular a protection fault caused by a stream prefetch request 136 of FIG. 1 according to the present invention is shown. Flow begins at block 1602.

At block 1602, memory subsystem 104 detects a request that specifies a location in system memory which violates the memory protection policy. Flow proceeds to decision block 1604.

At decision block 1604, memory subsystem 104 determines whether the protection fault detected in block 1602 was caused by a stream prefetch request 136, or whether the protection fault was caused by a load/store request 134. If by a stream prefetch request 136, flow proceeds to decision block 1612; otherwise, the protection fault was caused by a load/store request 134, and flow proceeds to block 1606.

At block 1606, microprocessor 100 notifies the operating system that a memory protection violation has occurred. Flow ends at block 1606.

At decision block 1612, memory subsystem 104 determines what the policy is for a protection fault generated by a stream prefetch request 136. In one embodiment, the protection fault miss policy is always to abort the stream prefetch request 136. In another embodiment, memory subsystem 104 determines the protection fault policy for stream prefetch requests by examining protection_fault_policy parameter 812 of FIG. 8 specified in stream descriptor 600 and stored in stream_prefetch_priority_parameters register 314 and forwarded to memory subsystem 104 in stream prefetch request 136 to determine whether the policy is to abort the stream prefetch request 136 or to handle the stream prefetch request 136 normally like any other load/store request 134. If the protection fault policy is to abort, then flow proceeds to block 1618; otherwise, flow proceeds to block 1614.

At block 1614, microprocessor 100 notifies the operating system that a memory protection violation has occurred. Flow ends at block 1614.

At block 1618, memory subsystem 104 aborts the stream prefetch request 136 without notifying the operating system of the memory protection violation. Flow ends at block 1618.

Referring now to FIG. 17, a block diagram of portions of memory subsystem 104 of FIG. 1 having a separate stream prefetch TLB according to the present invention is shown.

Memory subsystem 104 includes a load/store TLB 1704, coupled to receive load/store request 134, for caching virtual page addresses of load/store requests 134 and TLB information associated therewith. Load/store request 134 includes a virtual page address, which is looked up by load/store TLB 1704 and used to select an entry of TLB information in load/store TLB 1704. If the virtual page address of load/store request 134 misses in load/store TLB 1704, then load/store TLB 1704 outputs a true value on a miss signal 1744, which is provided to control logic 1706 of memory subsystem 104. If the virtual page address hits, then load/store TLB 1704 outputs a false value on a miss signal 1744, and provides the selected TLB information on TLB information signal 1714. Additionally, control logic 1706 generates an update signal 1742 to update load/store TLB 1704 with new TLB information as necessary.

The TLB information 1714 stored in load/store TLB 1704 includes address translation information, such as a translated physical page address of the virtual page address, and an indication of whether the page specified by the virtual page address is present in the system memory, which is used to detect page faults. The TLB information 1714 also includes memory protection information about the memory protection policy for the specified page, which is used to detect protection faults. The TLB information 1714 also includes attribute bits specifying the bus transaction priority for loads and stores of the specified memory page, such as discussed above with respect to FIG. 6.

Memory subsystem 104 also includes a multiplexer 1712. Multiplexer 1712 shown in the embodiment of FIG. 17 comprises a four-input multiplexer for receiving stream prefetch requests 136A-D of FIG. 2. Control logic 1706 arbitrates between the prefetch requests 136A-D for access to a stream prefetch TLB 1702 and generates a control signal 1738 provided to multiplexer 1712 to select one of the inputs for provision on an output 1718.

Memory subsystem 104 also includes stream prefetch TLB 1702, coupled to receive multiplexer 1712 output 1718. Stream prefetch TLB 1702 caches virtual page addresses of stream prefetch requests 136 and TLB information associated therewith. Stream prefetch request 136 includes a virtual page address, which is looked up by stream prefetch TLB 1702 and used to select an entry of TLB information in stream prefetch TLB 1702. If the virtual page address of stream prefetch request 136 misses in stream prefetch TLB 1702, then stream prefetch TLB 1702 outputs a true value on a miss signal 1724, which is provided to control logic 1706. If the virtual page address hits, then stream prefetch TLB 1702 outputs a false value on a miss signal 1724, and provides the selected TLB information on TLB information signal 1716, which is similar to TLB information 1714, except TLB information 1716 stores information related to data stream prefetches. Additionally, control logic 1706 generates an update signal 1722 to update stream prefetch TLB 1702 with new TLB information as necessary.

Memory subsystem 104 also includes a two-input multiplexer 1708. Multiplexer 1708 receives TLB information 1714 on one input and TLB information 1716 on the other input. Multiplexer 1708 selects one of the inputs for output as TLB information 1726 for provision to relevant parts of memory subsystem 104, such as tag comparators, based on a control signal 1736 generated by control logic 1706, and for provision to control logic 1706.

Referring now to FIG. 18, a block diagram of portions of memory subsystem 104 of FIG. 1 having a separate stream prefetch TLB according to an alternate embodiment of the present invention is shown. FIG. 18 is similar to FIG. 17, and like numbered elements are the same. FIG. 18 includes control logic 1806, which is very similar to, but slightly different from control logic 1706 of FIG. 17. The differences are described below. In addition to the elements of FIG. 17, FIG. 18 also includes a two-input multiplexer 1814 and a joint TLB 1802 that backs load/store TLB 1704 and stream prefetch TLB 1702. In one embodiment, joint TLB 1802 is a victim cache for load/store TLB 1704 and stream prefetch TLB 1702. An embodiment is also contemplated in which joint TLB 1802 also backs L1 instruction cache 156 of FIG. 1.

Multiplexer 1814 receives load/store request 134 on one input and receives the output 1718 of multiplexer 1712 on the other input. Multiplexer 1814 selects one of the inputs to provide on an output 1828 based on a control signal 1804 generated by control logic 1806.

Joint TLB 1802 functions similarly to load/store TLB 1704 and stream prefetch TLB 1702, but with respect to both load/store requests 134 and stream prefetch requests 136, based on receiving signal 1828 as an input. That is, joint TLB 1802 outputs TLB information 1826 similar to TLB information 1714 and 1716, outputs miss signal 1824 similar to miss signals 1724 and 1744, and receives update information 1822 similar to update information 1722 and 1742.

A three-input multiplexer 1808 of FIG. 18 replaces multiplexer 1708 of FIG. 17. Multiplexer 1808 receives joint TLB 1802 TLB information 1826 in addition to TLB information 1714 and TLB information 1716. Multiplexer 1808 selects one of the three inputs for output as TLB information 1726 for provision to relevant parts of memory subsystem 104, such as tag comparators, based on a control signal 1836 generated by control logic 1806, and for provision to control logic 1806.

Referring now to FIG. 19, a block diagram of portions of memory subsystem 104 of FIG. 1 having a separate stream prefetch TLB according to an alternate embodiment of the present invention is shown. FIG. 19 is similar to FIG. 17, except that a separate stream prefetch TLB is provided for each stream prefetch engine 202A-D of FIG. 2. Memory subsystem 104 includes a load/store TLB 1704 similar to that of FIG. 17.

Memory subsystem 104 also includes four stream prefetch TLBs 1902A-D that function similar to stream prefetch TLB 1702 of FIG. 17 with respect to respective stream prefetch requests 136A-D generated by stream prefetch engines 202A-D, respectively. Stream prefetch TLBs 1902A-D receive stream prefetch requests 136A-D, respectively, and generate TLB information 1716A-D and miss signals 1724A-D, respectively, and receive update information 1722A-D, respectively.

Memory subsystem 104 also includes a five-input multiplexer 1908. Multiplexer 1908 receives TLB information 1714 on one input and TLB information 1716A-D on the other four inputs. Multiplexer 1908 selects one of the five inputs for output as TLB information 1726 for provision to relevant parts of memory subsystem 104, such as tag comparators, based on a control signal 1936 generated by control logic 1906, and for provision to control logic 1906.

As may be seen from FIGS. 17 through 19, the separate stream prefetch TLB 1702 of memory subsystem 104 advantageously avoids the undesirable result of having stream prefetch operations pollute a unified TLB with respect to loads and stores, which are typically higher priority. Conversely, TLB information for stream prefetch entries is less likely to be evicted from a separate stream prefetch TLB, since they will not be evicted by loads or stores. It has been observed that data stream accesses are typically highly sequential in nature, rather than random. Furthermore, the latency associated with a TLB miss generated by a stream prefetch request 136 may be absorbed by the effect of maintaining the stream_fetch-ahead_distance 612, according to the present invention, while still avoiding polluting the load/store TLB 1704. Hence, advantageously a stream prefetch TLB 1702 may be very small. In one embodiment of FIG. 19, each of the stream prefetch TLBs 1702 comprises a single entry. In one embodiment of FIG. 19, each of the stream prefetch TLBs 1702 comprises two entries. Additionally, providing a separate TLB for each stream prefetch engine 202, as in the embodiment of FIG. 19, avoids the undesirable result of having stream prefetch operations from disparate stream prefetch engines 202 pollute the stream prefetch TLB 1702 of FIG. 17. An embodiment is also contemplated which combines the stream prefetch TLB per stream prefetch engine feature of FIG. 19 and the joint TLB feature of FIG. 18.

Figure 20:
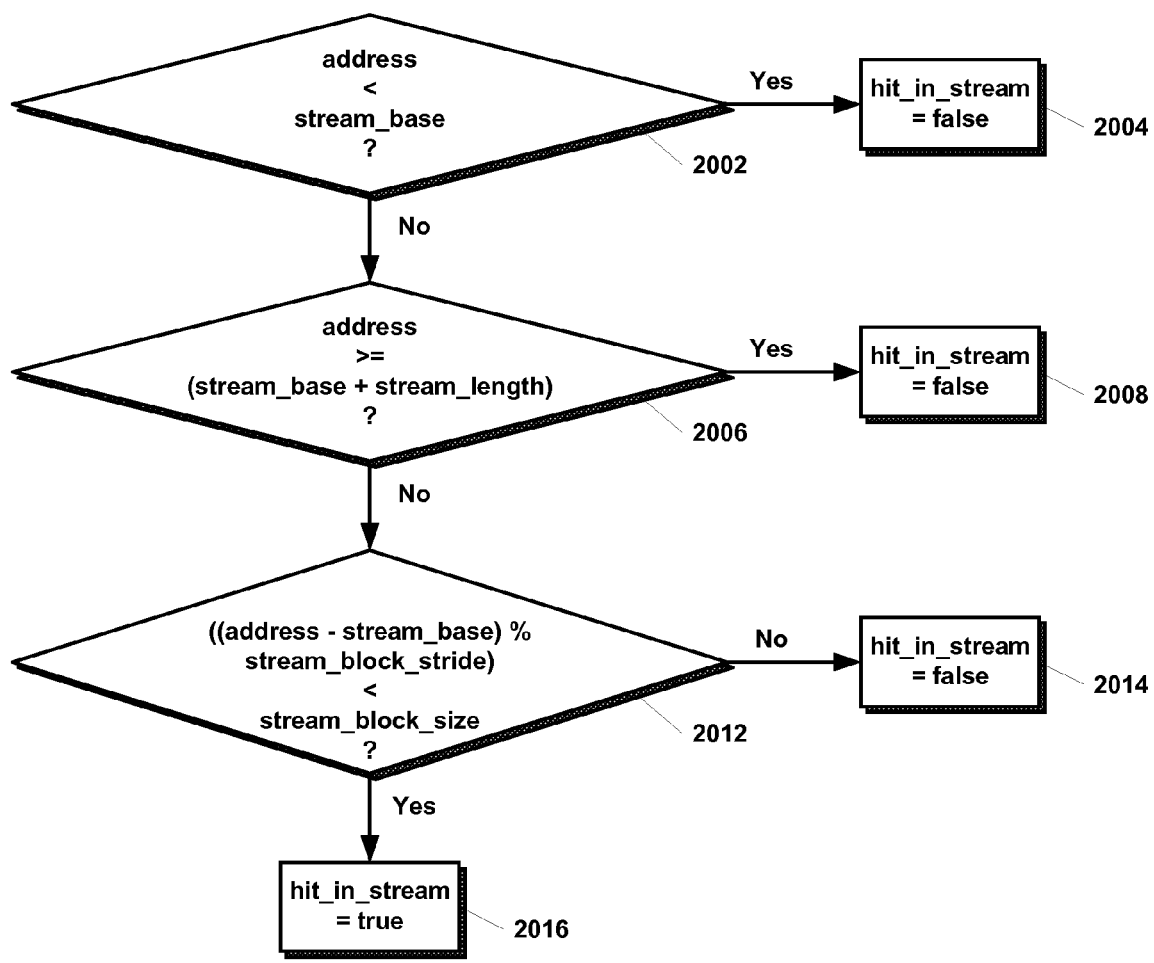
FIG. 20 is a flowchart illustrating operation of the stream hit detector of FIG. 3 according to the present invention.

Referring now to FIG. 20, a flowchart illustrating operation of stream hit detector 332 of FIG. 3 according to the present invention is shown. Flow begins at decision block 2002.

At decision block 2002, stream hit detector 332 determines whether the memory address of load/store request 134 of FIG. 1 is less than the stream_base 302 of FIG. 3. If so, flow proceeds to block 2004; otherwise, flow proceeds to decision block 2006.

At block 2004, stream hit detector 332 generates a false value on hit_in_stream signal 342 of FIG. 3. Flow ends at block 2004.

At decision block 2006, stream hit detector 332 determines whether the memory address of load/store request 134 of FIG. 1 is greater than or equal to the sum of the stream_base 302 and the stream_length 304 of FIG. 3. If so, flow proceeds to block 2008; otherwise, flow proceeds to decision block 2012.

At block 2008, stream hit detector 332 generates a false value on hit_in_stream signal 342. Flow ends at block 2008.

At decision block 2012, stream hit detector 332 determines whether the difference between the memory address of load/store request 134 and the stream_base 302, modulo the stream_block_stride 306 of FIG. 3, is less than the stream_block_size 308 of FIG. 3. If so, flow proceeds to block 2016; otherwise, flow proceeds to decision block 2014.

At block 2014, stream hit detector 332 generates a false value on hit_in_stream signal 342. Flow ends at block 2014.

At block 2016, stream hit detector 332 generates a true value on hit_in_stream signal 342. Flow ends at block 2016.

In one embodiment, stream hit detector 332 approximates detection of hits in the data stream. That is, rather than determining whether the memory address of load/store request 134 hits exactly within the data stream template specified by the stream descriptor 600, stream hit detector 332 rounds to a reasonable size power of two, such as the cache line size, to detect hits. Approximating detection of data stream hits simplifies the logic required by stream hit detector 332, particularly the logic required to perform the required modulo arithmetic. Advantageously, a small number of false hits in the data stream is not significantly detrimental since they would not constitute a large additional consumption of memory bandwidth or cache pollution. Furthermore, a small number of false misses in the data stream would not significantly undermine the goal of reducing memory fetch latency since it is highly likely that a subsequent load in the data stream will trigger prefetching, and the additional time can easily be absorbed by the stream_fetch-ahead distance 612.

Figure 21:
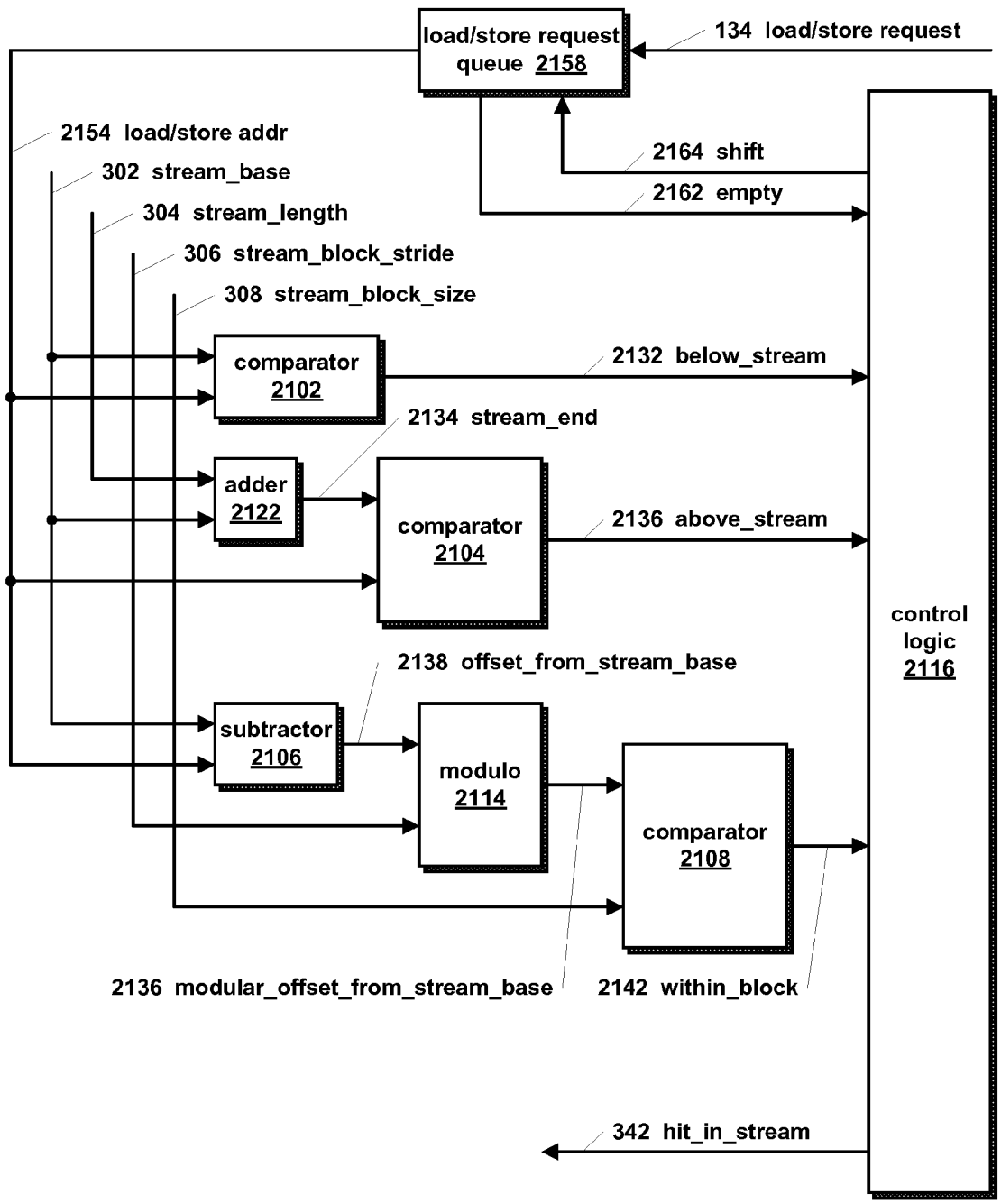
FIG. 21 is a block diagram of the stream hit detector of FIG. 3 according to one embodiment of the present invention.

Referring now to FIG. 21, a block diagram of stream hit detector 332 of FIG. 3 according to one embodiment of the present invention is shown.

Stream hit detector 332 includes a request queue 2158 that buffers a plurality of load/store requests 134 of FIG. 1. When a load/store request 134 is generated, request queue 2158 loads the request 134 in a first-in-first-out manner. Request queue 2158 outputs a load/store address 2154 included in the oldest load/store request 134 stored therein. Request queue 2158 generates a true value on an empty signal 2162, which is provided to control logic 2116, whenever it is empty; otherwise, request queue 2158 generates a false value on empty signal 2162. Control logic 2116 generates a true value on a shift signal 2164 when it has finished determining whether the oldest load/store request 134 in request queue 2158 hits in the data stream specified by stream descriptor registers 362, in response to which request queue 2158 shifts out the oldest load/store request 134. If the load/store request 134 hits in the data stream, then it is loaded into current_stream_hit_addr register 322 of FIG. 3. Request queue 2158 serves to reduce the likelihood that a hit in the data stream template is not detected in the event that load/store requests 134 are generated at a faster rate than stream hit detector 332 can detect stream hits. In one embodiment, request queue 2158 is not included.

Stream hit detector 332 includes a first comparator 2102 that compares load/store request address 2154 with the stream_base register 302 value. Comparator 2102 generates a true value on below_stream signal 2132, which is provided to control logic 2116, if load/store request address 2154 is less than stream_base 302; otherwise, comparator 2102 generates a false value on below_stream signal 2132.

Stream hit detector 332 also includes an adder 2122 that adds stream_base 302 and stream_length 304 to generate a stream_end signal 2134.

Stream hit detector 332 also includes a second comparator 2104 that compares load/store address 2154 with stream_end 2134. Comparator 2104 generates a true value on above_stream signal 2136, which is provided to control logic 2116, if load/store address 2154 is greater than or equal to stream_end 2134; otherwise, comparator 2102 generates a false value on above_stream signal 2136.

Stream hit detector 332 also includes a subtractor 2106 that subtracts stream_base 302 from load/store request address 2154 to generate an offset_from_stream_base signal 2138.

Stream hit detector 332 also includes a modulo circuit 2114 that performs a modulo operation on offset_from_stream_base signal 2138, using the stream_block_stride 306 as the modulus, to generate a modular_offset_from_stream_base signal 2136.

Stream hit detector 332 also includes a third comparator 2108 that compares the modular_offset_from_stream_base 2136 with stream_block_size 308 and generates a true value on within_block signal 2142 if modular_offset_from_stream_base 2136 is less than stream_block_size 308 and generates a false value otherwise.

Control logic 2116 generates a true value on hit_in_stream signal 342 of FIG. 3 if above_stream signal 2136 and below_stream signal 2132 are both false and within_block signal 2142 is true.

Figure 22:
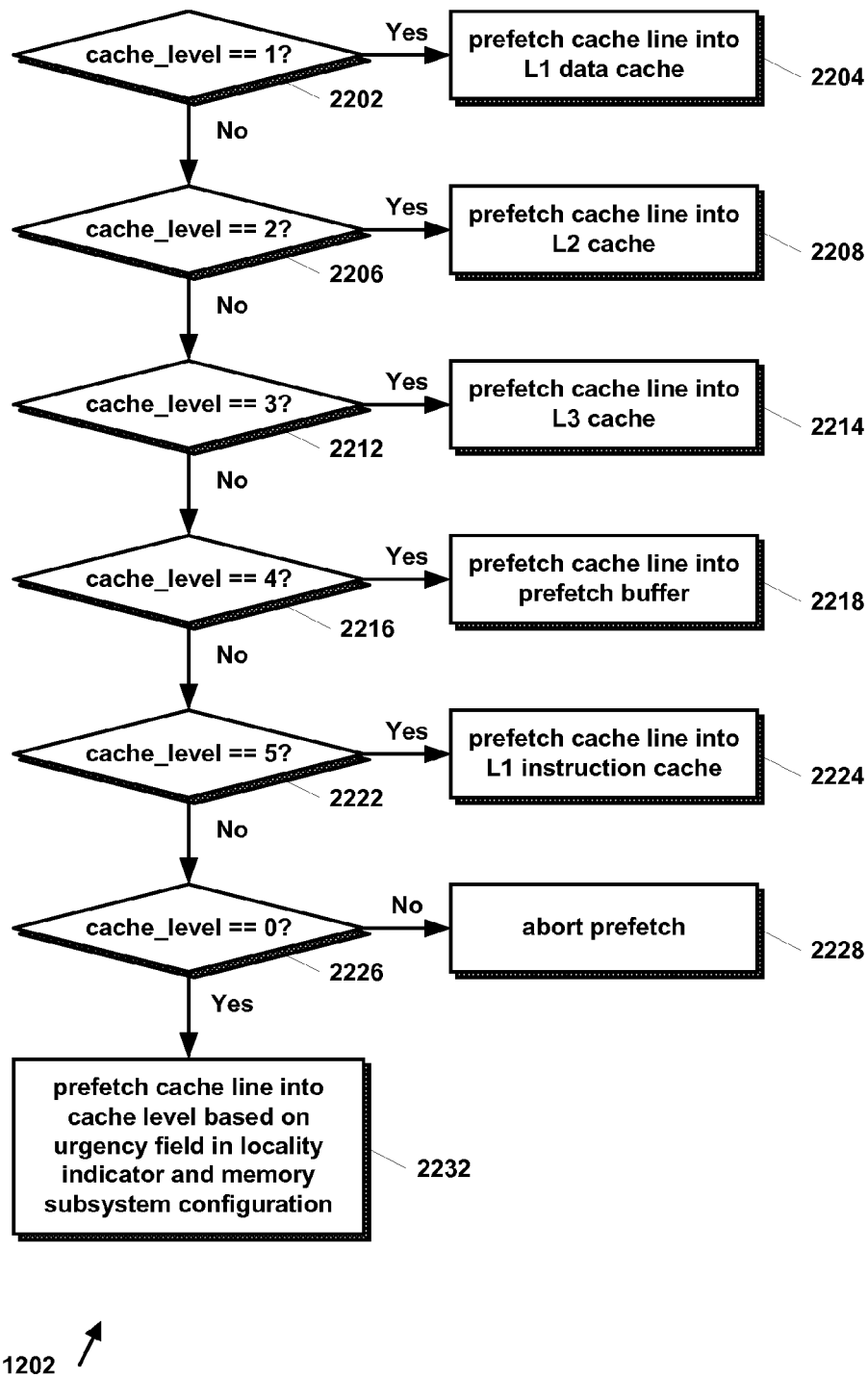
FIG. 22 is a flowchart illustrating in detail block 1202 of FIG. 12 according to the present invention.

Referring now to FIG. 22, a flowchart illustrating in detail block 1202 of FIG. 12 according to the present invention is shown. Flow begins at decision block 2202.

At decision block 2202, memory subsystem 104 of FIG. 1 determines whether the value of cache_level indicator 802 of FIG. 8 of stream prefetch request 136 of FIG. 1 equals a value of 1. If so flow proceeds to block 2204; otherwise, flow proceeds to decision block 2206.

At block 2204, memory subsystem 104 generates a request to bus interface unit 102 of FIG. 1 to prefetch the cache line containing the location specified by current_prefetch_address 324 of FIG. 3 in stream prefetch request 136 from the system memory into L1 data cache 158 of FIG. 1. Flow ends at block 2204.

At decision block 2206, memory subsystem 104 determines whether the value of cache_level indicator 802 of stream prefetch request 136 equals a value of 2. If so flow proceeds to block 2208; otherwise, flow proceeds to decision block 2212.

At block 2208, memory subsystem 104 generates a request to bus interface unit 102 to prefetch the cache line containing the location specified by current_prefetch_address 324 in stream prefetch request 136 from the system memory into L2 cache 154 of FIG. 1. Flow ends at block 2208.

At decision block 2212, memory subsystem 104 determines whether the value of cache_level indicator 802 of stream prefetch request 136 equals a value of 3. If so flow proceeds to block 2214; otherwise, flow proceeds to decision block 2216.

At block 2214, memory subsystem 104 generates a request to bus interface unit 102 to prefetch the cache line containing the location specified by current_prefetch_address 324 in stream prefetch request 136 from the system memory into L3 cache 152 of FIG. 1. Flow ends at block 2214.

At decision block 2216, memory subsystem 104 determines whether the value of cache_level indicator 802 of stream prefetch request 136 equals a value of 4. If so flow proceeds to block 2218; otherwise, flow proceeds to decision block 2222.

At block 2218, memory subsystem 104 generates a request to bus interface unit 102 to prefetch the cache line containing the location specified by current_prefetch_address 324 in stream prefetch request 136 from the system memory into a prefetch buffer of memory subsystem 104 not shown in the embodiment of FIG. 1. Flow ends at block 2218.

At decision block 2222, memory subsystem 104 determines whether the value of cache_level indicator 802 of stream prefetch request 136 equals a value of 5. If so flow proceeds to block 2224; otherwise, flow proceeds to decision block 2226.

At block 2224, memory subsystem 104 generates a request to bus interface unit 102 to prefetch the cache line containing the location specified by current_prefetch_address 324 in stream prefetch request 136 from the system memory into L1 instruction cache 156 of FIG. 1. Flow ends at block 2224.

At decision block 2226, memory subsystem 104 determines whether the value of cache_level indicator 802 of stream prefetch request 136 equals a value of 0. If so flow proceeds to block 2232; otherwise, flow proceeds to block 2228.

At block 2228, memory subsystem 104 aborts the stream prefetch request 136, because in the embodiment shown, only the values 0 through 5 are valid values for the cache_level indicator 802. Flow ends at block 2228.

At block 2232, memory subsystem 104 generates a request to bus interface unit 102 to prefetch the cache line containing the location specified by current_prefetch_address 324 in stream prefetch request 136 from the system memory into one of the caches of memory subsystem 104 based on the urgency field in locality indicator 804 of FIG. 8 and upon the memory subsystem 104 configuration, i.e., on the number of caches, their relationship in the hierarchy, and the size of each cache. In another embodiment, stream prefetch engine 202 also bases the choice of destination cache of memory subsystem 104 on the stream_fetch-ahead_distance 612 of FIG. 6. In another embodiment, stream prefetch engine 202 also bases the choice of destination cache of memory subsystem 104 on the stream_prefetch_hysteresis value 818 of FIG. 8. Flow ends at block 2232.

Figure 23:
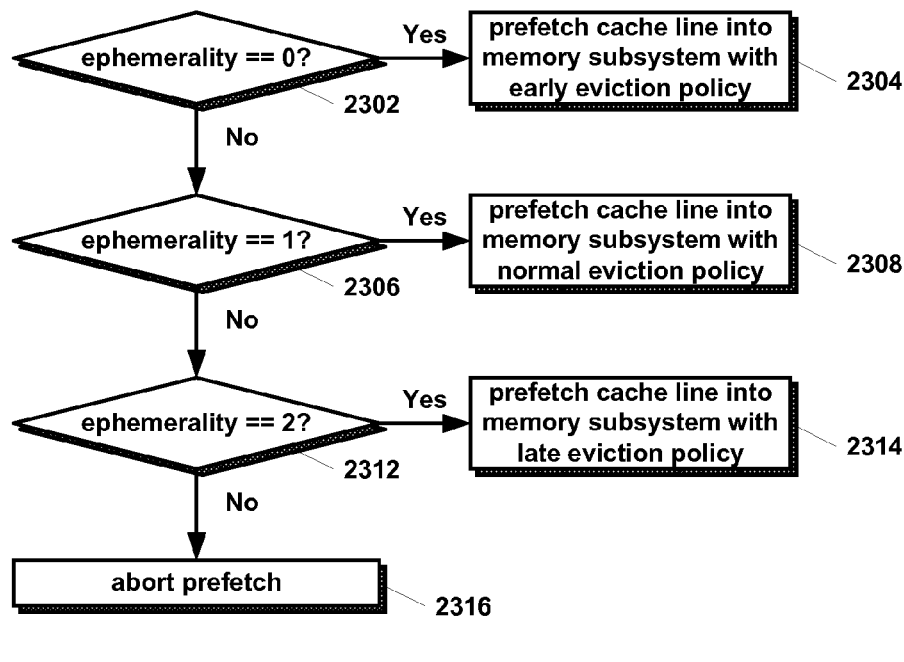
FIG. 23 is a flowchart illustrating in detail block 1202 of FIG. 12 according to the present invention is shown.

Referring now to FIG. 23, a flowchart illustrating in detail block 1202 of FIG. 12 according to the present invention is shown. Flow begins at decision block 2302.

At decision block 2302, memory subsystem 104 of FIG. 1 determines whether the ephemerality field value of locality indicator 804 of FIG. 8 of stream prefetch request 136 of FIG. 1 equals a value of 0. If so flow proceeds to block 2304; otherwise, flow proceeds to decision block 2306.

At block 2304, memory subsystem 104 generates a request to bus interface unit 102 of FIG. 1 to prefetch the cache line containing the location specified by current_prefetch_address 324 of FIG. 3 in stream prefetch request 136 from the system memory into a cache of memory subsystem 104 with an early eviction policy. Flow ends at block 2304.

At decision block 2306, memory subsystem 104 determines whether the ephemerality field value of locality indicator 804 of stream prefetch request 136 equals a value of 1. If so flow proceeds to block 2308; otherwise, flow proceeds to decision block 2312.

At block 2308, memory subsystem 104 generates a request to bus interface unit 102 to prefetch the cache line containing the location specified by current_prefetch_address 324 in stream prefetch request 136 from the system memory into a cache of memory subsystem 104 with a normal eviction policy. Flow ends at block 2308.

At decision block 2312, memory subsystem 104 determines whether the ephemerality field value of locality indicator 804 of stream prefetch request 136 equals a value of 2. If so flow proceeds to block 2314; otherwise, flow proceeds to block 2316.

At block 2314, memory subsystem 104 generates a request to bus interface unit 102 to prefetch the cache line containing the location specified by current_prefetch_address 324 in stream prefetch request 136 from the system memory into a cache of memory subsystem 104 with a late eviction policy. Flow ends at block 2314.

At block 2316, memory subsystem 104 aborts the stream prefetch request 136, because in the embodiment shown, only the values 0 through 2 are valid values for the ephemerality field of locality indicator 804. Flow ends at block 2316.

Although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Also, although the memory subsystem has been described with respect to particular configurations, one skilled in the art will appreciate that the applicability of the cache_level and locality parameters is not limited to a particular configuration. Furthermore, although the microprocessor has been described as synchronizing stream prefetches with load and store instructions, one skilled in the art will appreciate that stream prefetches may be synchronized with other memory access instructions in microprocessors whose instruction sets do not include explicit load and store instructions. Additionally, although a stream descriptor has been described that enables a programmer to specify variable-sized stream blocks separated by a stream block stride, other data streams may be specified, such as a data stream with a compound stride. For example, the stream prefetch engine may fetch N blocks at stride K followed by M blocks at stride L and then repeat. Additionally, other more complex data streams may be described by the stream descriptor, such as trees and graphs. Furthermore, the stream length could be described in the stream descriptor as the number of stream blocks in the data stream. Alternatively, the stream length could be described as the actual number of bytes in the data stream template, i.e., the number of bytes in the subset, rather than as the number of contiguous bytes between the first and last byte of the data stream. Similarly, the stream_fetch-ahead_distance could be described as the number of bytes in the data stream template, i.e., the number of bytes in the subset, to fetch ahead rather than as the number of contiguous bytes to fetch ahead. Additionally, the stream descriptor may specify an instruction stream, i.e., a stream of instructions, rather than a data stream, for prefetching into the instruction cache of the microprocessor. Finally, rather than synchronizing stream prefetching implicitly, by monitoring loads and stores for hits in the data stream, explicit synchronization could be accomplished by adding new load and store instructions to the instruction set (or additional bits to existing load and store instructions) that when executed explicitly trigger the stream prefetch engine to advance, thereby eliminating the need for a stream hit detector. The new instructions would include a stream_ID parameter (returned by the stream prefetch instruction) for specifying which of the stream prefetch engines to trigger. Alternatively, normal load and store instructions could be assumed to advance a predetermined one of the stream prefetch engines, and new instructions would explicitly advance the other stream prefetch engines. A variation of the explicit stream prefetch trigger instructions in a microprocessor that includes a stream hit detector is to add a bit to the normal load and store instructions which, if set, instructs the stream prefetch engine not to trigger prefetching, which might be useful when the programmer knows he needs to access something in the data stream once, but wishes to avoid triggering a prefetch that would bring data into the cache prematurely or unnecessarily, at the expense of evicting more important data.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A microprocessor coupled to a system memory, the microprocessor comprising:
    a memory subsystem, having a translation look-aside buffer (TLB) for storing TLB information;
    an instruction decode unit, coupled to said memory subsystem, for decoding an instruction, said instruction specifying a data stream in the system memory and an abnormal TLB access policy;
    a stream prefetch unit, coupled to said memory subsystem, for generating a prefetch request to said memory subsystem to prefetch a cache line of said data stream from the system memory into said memory subsystem, wherein if a virtual page address of said prefetch request causes an abnormal TLB access, said memory subsystem selectively aborts said prefetch request based on said abnormal TLB access policy specified in said instruction; and
    a load unit, coupled to said memory subsystem, for generating a load request to said memory subsystem to load data from the system memory into said memory subsystem, wherein, in response to the abnormal TLB access, said TLB information is updated from the system memory and said stream prefetch unit resumes prefetching said cache line of said data stream.

2. The microprocessor as recited in claim 1, wherein said abnormal TLB access policy comprises a TLB miss policy, wherein if said virtual page address of said prefetch request causes a TLB miss of said TLB, said memory subsystem selectively aborts said prefetch request based on said TLB miss policy specified in said instruction.

3. The microprocessor as recited in claim 2, wherein said memory subsystem aborts said prefetch request if said TLB miss policy specifies a first predetermined value, and fetches address translation information associated with said missing virtual page address into said TLB from the system memory in response to said miss if said TLB miss policy specifies a second predetermined value.

4. The microprocessor as recited in claim 1, wherein said abnormal TLB access policy comprises a page fault policy, wherein if said TLB information selected by said virtual page address of said prefetch request indicates a condition in which said memory page specified by said virtual page address is not present in the system memory, said memory subsystem selectively aborts said prefetch request based on said page fault policy specified in said instruction.

5. The microprocessor as recited in claim 4, wherein said memory subsystem aborts said prefetch request if said page fault policy specifies a first predetermined value, and notifies an operating system executing on the microprocessor of said condition in response to detection of said condition if said page fault policy specifies a second predetermined value.

6. The microprocessor as recited in claim 1, wherein said abnormal TLB access policy comprises a protection fault policy, wherein if said TLB information selected by said virtual page address of said prefetch request indicates a condition in which said virtual page address accessing said TLB causes a memory protection violation, said memory subsystem selectively aborts said prefetch request based on said protection fault policy specified in said instruction.

7. The microprocessor as recited in claim 6, wherein said memory subsystem aborts said prefetch request if said protection fault policy specifies a first predetermined value, and notifies an operating system executing on the microprocessor of said condition in response to detection of said condition if said protection fault policy specifies a second predetermined value.

8. A method for prefetching a data stream into a microprocessor from a system memory coupled to the microprocessor, the microprocessor having a translation look-aside buffer (TLB), the method comprising:
    decoding an instruction, specifying the data stream, and a parameter specifying an abnormal TLB access policy;
    monitoring load requests generated by the microprocessor;
    generating a prefetch request to prefetch a cache line of said data stream from the system memory into the microprocessor in response to said monitoring, said new request including a virtual page address of said cache line;

selectively aborting said prefetch request if said virtual page address causes an abnormal access of said TLB, based on said abnormal TLB access policy specified in said parameter; and generating a load request to said memory subsystem to load data from the system memory into said memory subsystem, wherein, in response to the abnormal access of said TLB, information from the system memory is updated in said TLB and said prefetching said cache line of said data stream is resumed.

9. The method as recited in claim 8, wherein said abnormal TLB access policy comprises a TLB miss policy, wherein said selectively aborting said prefetch request comprises said memory subsystem aborting said prefetch request if said TLB miss policy specifies a first predetermined value, and fetching address translation information associated with said missing virtual page address into said TLB from the system memory in response to said miss if said TLB miss policy specifies a second predetermined value.

10. The method as recited in claim 8, wherein said abnormal TLB access policy comprises a page fault policy, wherein said selectively aborting said prefetch request comprises said memory subsystem aborting said prefetch request if said page fault policy specifies a first predetermined value, and notifying an operating system executing on the microprocessor of said condition in response to detection of said condition if said page fault policy specifies a second predetermined value.

11. The method as recited in claim 8, wherein said abnormal TLB access policy comprises a protection fault policy, wherein said selectively aborting said prefetch request comprises said memory subsystem aborting said prefetch request if said protection fault policy specifies a first predetermined value, and notifying an operating system executing on the microprocessor of said condition in response to detection of said condition if said protection fault policy specifies a second predetermined value.

12. A computer program product for use with a computing device, the computer program product comprising:

a tangible computer usable storage medium, having computer readable program code embodied thereon, for causing a microprocessor coupled to a system memory, said computer readable program code comprising:

first computer readable program code for providing a memory subsystem, having a translation look-aside buffer (TLB) for storing TLB information;

second computer readable program code for providing an instruction decode unit, coupled to said memory subsystem, for decoding an instruction, said instruction specifying a data stream in the system memory and an abnormal TLB access policy;

third computer readable program code for providing a stream prefetch unit, coupled to said memory subsystem, for generating a prefetch request to said memory subsystem to prefetch a cache line of said data stream from the system memory into said memory subsystem, wherein if a virtual page address of said prefetch request causes an abnormal TLB access, said memory subsystem selectively aborts said prefetch request based on said abnormal TLB access policy specified in said instruction; and fourth computer readable program code for providing a load unit, coupled to said memory subsystem, for generating a load request to said memory subsystem to load data from the system memory into said memory subsystem, wherein, in response to the abnormal TLB access, said TLB information is updated from the system memory and said stream prefetch unit resumes prefetching said cache line of said data stream.

13. The computer program product as recited in claim 12, wherein said abnormal TLB access policy comprises a TLB miss policy, wherein if said virtual page address of said prefetch request causes a TLB miss of said TLB, said memory subsystem selectively aborts said prefetch request based on said TLB miss policy specified in said instruction.

14. The computer program product as recited in claim 13, wherein said memory subsystem aborts said prefetch request if said TLB miss policy specifies a first predetermined value, and fetches address translation information associated with said missing virtual page address into said TLB from the system memory in response to said miss if said TLB miss policy specifies a second predetermined value.

15. The computer program product as recited in claim 12, wherein said abnormal TLB access policy comprises a page fault policy, wherein if said TLB information selected by said virtual page address of said prefetch request indicates a condition in which said memory page specified by said virtual page address is not present in the system memory, said memory subsystem selectively aborts said prefetch request based on said page fault policy specified in said instruction.

16. The computer program product as recited in claim 15, wherein said memory subsystem aborts said prefetch request if said page fault policy specifies a first predetermined value, and notifies an operating system executing on the microprocessor of said condition in response to detection of said condition if said page fault policy specifies a second predetermined value.

17. The computer program product as recited in claim 12, wherein said abnormal TLB access policy comprises a protection fault policy, wherein if said TLB information selected by said virtual page address of said prefetch request indicates a condition in which said virtual page address accessing said TLB causes a memory protection violation, said memory subsystem selectively aborts said prefetch request based on said protection fault policy specified in said instruction.

18. The computer program product as recited in claim 17, wherein said memory subsystem aborts said prefetch request if said protection fault policy specifies a first predetermined value, and notifies an operating system executing on the microprocessor of said condition in response to detection of said condition if said protection fault policy specifies a second predetermined value.

* * * * *